United States Patent
Heckerman et al.

(10) Patent No.: US 6,542,878 B1
(45) Date of Patent: Apr. 1, 2003

(54) DETERMINING WHETHER A VARIABLE IS NUMERIC OR NON-NUMERIC

(75) Inventors: David E. Heckerman, Bellevue, WA (US); Robert L. Rounthwaite, Fall City, WA (US); Jeffrey R. Bernhardt, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/298,737

(22) Filed: Apr. 23, 1999

(51) Int. Cl.⁷ .................. G06F 15/18; G06F 17/30; G06F 7/00
(52) U.S. Cl. .............. 706/20; 706/15; 706/18; 707/4; 707/6
(58) Field of Search .............. 706/18, 20, 21, 706/15, 17; 707/4, 6; 705/10, 14; 725/11, 23, 32–36

(56) References Cited

U.S. PATENT DOCUMENTS

| | | | | |
|---|---|---|---|---|
| 4,688,195 A | * | 8/1987 | Thompson et al. ............ 706/11 |
| 4,899,290 A | * | 2/1990 | Hartzband .................... 706/12 |
| 5,179,549 A | * | 1/1993 | Joos et al. .................... 370/232 |
| 5,195,172 A | * | 3/1993 | Elad et al. ....................... 705/7 |
| 5,394,509 A | * | 2/1995 | Winston ....................... 706/13 |
| 5,630,126 A | * | 5/1997 | Redpath ................. 707/103 R |
| 5,691,895 A | * | 11/1997 | Kurtzberg et al. ............. 700/29 |
| 5,696,884 A | * | 12/1997 | Heckerman et al. .......... 706/52 |
| 5,704,017 A | * | 12/1997 | Heckerman et al. .......... 706/12 |
| 5,704,018 A | * | 12/1997 | Heckerman et al. .......... 706/12 |
| 5,710,700 A | * | 1/1998 | Kurtzberg et al. ............. 700/29 |
| 5,715,374 A | * | 2/1998 | Heckerman et al. ........ 700/246 |
| 5,740,323 A | * | 4/1998 | Nomura et al. ............... 706/13 |
| 5,802,256 A | * | 9/1998 | Heckerman et al. .......... 706/45 |
| 5,813,002 A | * | 9/1998 | Aggrawal et al. ............. 707/5 |
| 5,920,855 A | | 7/1999 | Aggerwal et al. ............. 707/3 |
| 5,926,822 A | * | 7/1999 | Garman ....................... 707/503 |
| 5,938,594 A | | 8/1999 | Poon et al. ................. 600/300 |
| 6,026,397 A | | 2/2000 | Sheppard ....................... 707/5 |
| 6,078,901 A | | 6/2000 | Ching .......................... 705/35 |
| 6,078,918 A | | 6/2000 | Allen et al. .................... 707/6 |
| 6,092,064 A | | 7/2000 | Aggarwal et al. ............. 707/6 |
| 6,154,736 A | | 11/2000 | Chickering et al. ........... 706/59 |
| 6,216,134 B1 | | 4/2001 | Heckerman et al. ..... 707/104.1 |
| 6,219,626 B1 | * | 4/2001 | Steinmetz et al. .......... 702/183 |
| 6,223,171 B1 | * | 4/2001 | Chaudhuri et al. ............ 707/2 |
| 6,263,455 B1 | * | 7/2001 | Bannister ..................... 714/25 |
| 6,321,225 B1 | * | 11/2001 | Heckerman et al. .......... 707/6 |
| 6,330,563 B1 | * | 12/2001 | Heckerman et al. ........ 707/100 |
| 6,405,200 B1 | * | 6/2002 | Heckerman .................. 707/10 |

OTHER PUBLICATIONS

Lorentzos, N.A., DBMS Support for Nonmetric Measurement Systems, IEEE Transactions on Knowledge and Data Engineering, Dec. 1994, vol. 6, No. 4, pp. 945–953.*
Bradburn, D., Self–Organization of Non–Numeric Data Sets, IJCNN–91–Seattle International Conference on Neural Networks Jul. 1991, vol. 1, pp. 37–41.*

(List continued on next page.)

*Primary Examiner*—John A. Follansbee
*Assistant Examiner*—Kelvin Booker
(74) *Attorney, Agent, or Firm*—Amin & Turocy, LLP

(57) ABSTRACT

Determination as to whether a variable is numeric or non-numeric. In one embodiment, a variable is input having a plurality of values, where each value has a count. The variable is determined to be numeric or non-numeric by assessing closeness of counts for adjacent values of the variable. Whether the variable is numeric or non-numeric is then output.

20 Claims, 18 Drawing Sheets

OTHER PUBLICATIONS

Marimin et al., Non–Numeric Preference Relations and Their Satisfaction Degrees for Pairwise Fuzzy Group–Decision Making Proceedings of the 35th Conference on Decision and Control, Dec. 1996, vol. 1, pp. 108–109.*

Geiser et al., Probabilistic Relevance Relations, IEEE Transactions on Systems, Man, and Cybernetics–Part A: Systems and Humans, Jan. 1998, vol. 28, No. 1, pp. 17–25.*

Heckerman et al., Likelihoods and Parameter Priors for Bayesian Networks, Technical Report–Microsoft Research Advance Technology Division, Nov. 1995, Retrieved from the Internet; http://citeseer.nj.nec.com/43265.html.*

Chaudhuri et al., Scalable Classification Over SQL Databases, Proceedings of the 15th International Conference on Data Engineering, Mar. 1999, pp. 470–479.*

Mowry et al., Predicting Data Cache Misses in Non–Numeric Applications Through Correlation Profiling, Proceedings of the 13th Annual IEEE/ACM International Symposium on Microarchitecture, Dec. 1997, pp. 314–320.*

Wong et al.; "A Hybrid Approach for Automated Trading Systems". Proceedings of the 1994 Second Australian and New Zealand Conference in Intelligent Information Systems, Nov. 1994, p. 278–282.*

Mowry et al.; "Predicting Data Cache Misses in Non–Numeric Applications Through Correlation Profiling". Proceedings of the $13^{th}$ Annual IEEE/ACM International Symposium on Microarchitecture, Dec. 1997, p. 314–320.*

Bradburn, D.S.; "Self–Organization of Non–Numeric Data Sets". IJCNN–91–Seattle International Joint Conference on Neural Networks, Jul. 1991, p. 37–41, vol. 1.*

* cited by examiner

600

DETERMINING WHETHER A VARIABLE IS NUMERIC OR NON-NUMERIC

FIELD OF THE INVENTION

This invention relates generally to data modeling, and more particularly to determining whether a variable is numeric or non-numeric.

BACKGROUND OF THE INVENTION

Data analysis has become an important tool in solving complex and large real-world computerizable problems. For example, a web site such as msnbc.com has many stories available on any given day or month The operators of such a web site may desire to know whether there are any commonalities associated with the viewership of a given set of programs. That is, if a hypothetical user reads one given story, can with any probability it be said that the user is likely to read another given story. Yielding the answer to this type of inquiry allows the operators of the web site to better organize their site, for example, which may in turn yield increased readership.

For problems such as these, data analysts frequently turn to advanced statistical tools and models, to analyze the data. Data analysis, defined broadly, is the process by which knowledge, models, patterns, decision policies, and/or insight are gained from data. Specific examples of data analysis include pattern recognition, data modeling, and data mining. Other specific applications include: predicting what products a person will want to buy given what is already in his or her shopping basket; predicting what ads a person will click on given what other ads he or she has clicked on, what web pages he or she has read, and/or his or her demographics; predicting what television shows a person will want to watch based on other television shows he or she has watched, and/or his or her demographics. Still other specific applications are listed in the detailed description of the invention.

Generally, data analysis includes three main phases: a problem formulation phase, a model fitting/model selection phase, and a model understanding/visualization phase. Usually, each of these phases is iterated through until the desired knowledge, models, patterns, or insights are achieved. The models or patterns obtained often are then used for prediction for other data.

However, whereas there are many automated or computerized techniques for model fitting/model selection and a few useful automated techniques for explaining statistical models, methods for problem formulation generally are performed by a human, the data analyst. In this phase, the data analyst takes a rough look at the data and uses his or her common sense to form a statistical model or set of models that is then used to fit the data.

For example, a data analyst may be given a set of web-transaction logs from a news site and asked "use this data to predict what ads a user is most likely to click through". The problem-formulation phase may proceed as follows. First, the analyst looks at the logs and may recognize that the news stories a user reads (information available in the logs) can be useful for predicting what ads a user will click through. The analyst then decides whether news stories themselves are good predictors, or whether it is better to use news-story categories to predict ad click through. He or she then decides which set of news stories or news categories are worth including in the model, since the inclusion of all stories is impractical.

The result of these decisions is a list of variables to include in the model. Next, the data analyst decides how to model each variable. Although the number of times a story is read is available in the web-transaction logs, the data analyst may decide to model only whether or not a user reads the story. Another alternative may be to retain the more detailed information, in which case the data analyst has to decide whether to model this quantity with a Gaussian distribution or some more complicated distribution, for instance. Finally, the data analyst may decide to model the relationships between stories read and ads clicked using a Bayesian network.

There are disadvantages associated with having to have a data analyst perform the problem formulation phase. The amount of data that is available for analysis is increasing at an exponential rate, but there are a limited number of statisticians/data analysts available who can analyze this data, thus limiting how often statistical models can be utilizes for data analysis. The process of problem formulation is itself difficult to automate because so much human knowledge is typical brought to bear on a particular problem. In the above example, for instance, a computer would generally not know that stories read may be predictive of ad click through, because both are related to the underlying "personality type" of the user. A computer would also typically not know to model a story variable as binary rather than numeric is appropriate.

For these and other reasons, there is a need for the present invention.

SUMMARY OF THE INVENTION

The invention relates to automated data analysis. In one embodiment, relating to an architecture for automated data analysis, a computerized system comprises an automated problem formulation layer, a first learning engine, and a second learning engine. The automated problem formulation layer receives a data set. The data set has a plurality of records, where each record has a value for each of a plurality of raw transactional variables (as is defined later in the application). The layer abstracts the raw transactional variables into cooked transactional variables. The first learning engine generates a model for the cooked transactional variables, while the second learning engine generates a model for the raw transactional variables.

In an embodiment relating to feature abstraction, a data set is input that has a plurality of records, where each record has a value for each of a plurality of raw transactional variables. These variables are organized into a hierarchy of nodes. The raw transactional variables are abstracted into a lesser number of cooked transactional variables, and the cooked transactional variables are output.

In an embodiment relating to creation of a model for raw variables from a model for cooked variables and raw data, a first data model for a plurality of cooked transactional variables is input. The cooked transactional variables have been abstracted from raw transactional variables, where the latter variables are based on a data set comprising a plurality of records, each record having a value for each raw transactional variables. A type of the first model is determined, and a second data model, for the plurality of raw transactional variables, is generated based on the first data model and the type of the first data model. The second data model is then output.

In an embodiment relating to determining whether a variable is numeric or non-numeric, a variable is input having a plurality of values, where each value has a count.

The variable is determined to be numeric or non-numeric by assessing closeness of counts for adjacent values of the variable. Whether the variable is numeric or non-numeric is then output.

Finally, in an embodiment relating to determining whether a numeric variable has a Gaussian or a log-Gaussian distribution, a data set is first input. The data set has a plurality of records. Each record has a value for each of a plurality of raw non-transactional variables. The plurality of raw non-transactional variables includes a numeric variable. It is determined whether a Gaussian or a log-Gaussian distribution better predicts the numeric variable, based on the plurality of records. This determination is then output.

Embodiments of the invention provide for automated data analysis, and thus provide for advantages over the prior art. Automated data analysis is useful because data analysts are not needed to perform the data analysis—specifically the problem formulation phase of the analysis process. This makes data analysis more useful because it opens up data analysis to be used in more situations—for example, where a data analyst may be too expensive or not available to use.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
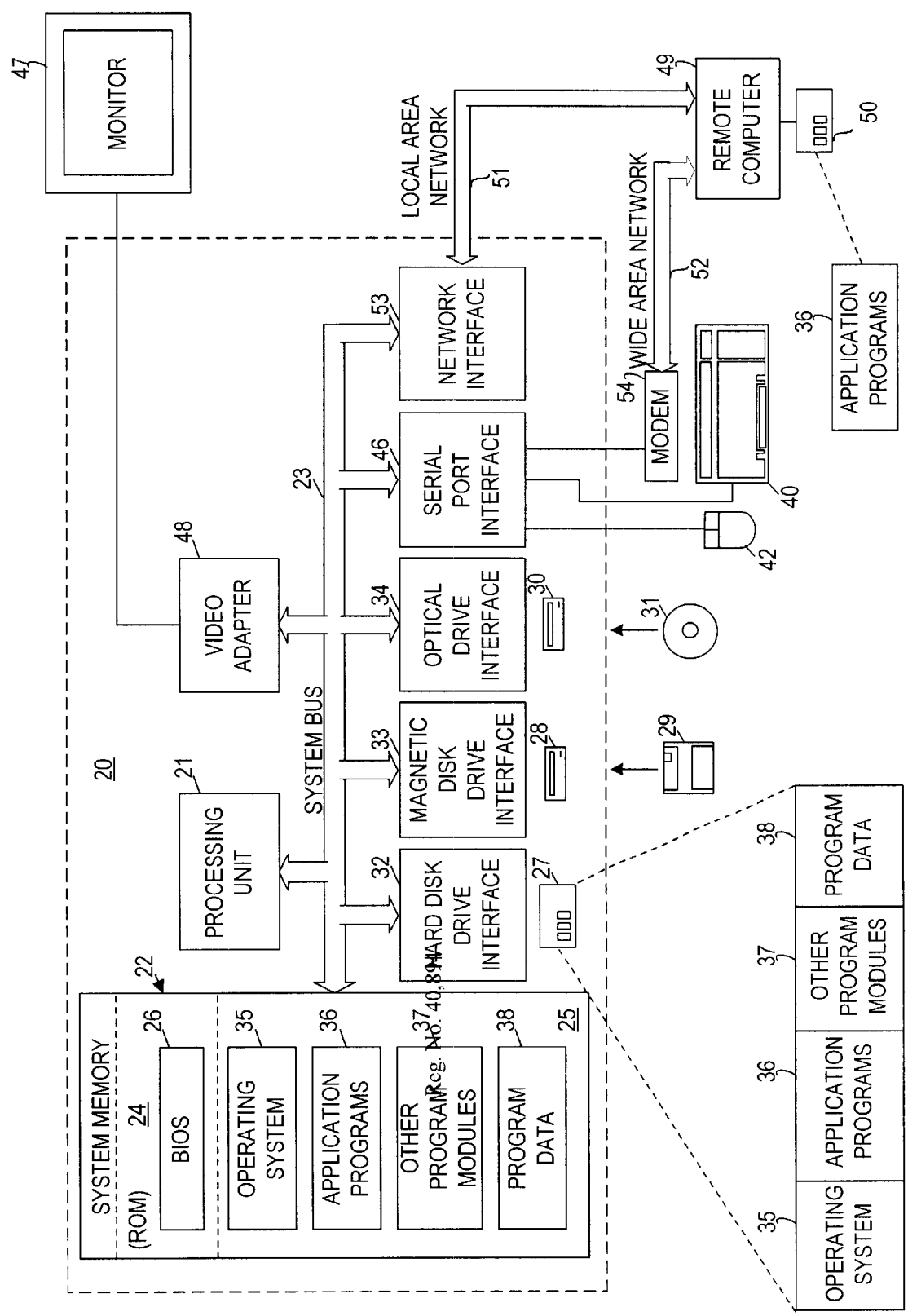
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Architecture for Automated Data Analysis

In this section, description is provided of an architecture for automated data analysis. More specifically, the architecture provides for model fitting and model selection and explanation and visualization to produce automated data analyses. In one embodiment, the analysis to which the architecture is applicable is limited as follows. First, the analysis is limited to predictions that a computer user will take (e.g., what ads they will click through on the web, what stories they will read on the web, what products they will purchase on the web) based on other information known about the user. When the actions predicted are user preferences, this task is occasionally referred to as collaborative filtering. Second, the analysis is limited to segmentation of users into a set of clusters such that users in the same cluster exhibit roughly the same behavior and users in different cluster exhibit different behavior. Third, the analysis is limited to data that includes both transactional and non-transactional data (as described below), which is referred to as enterprise domain data sets.

Referring first to FIG. 5(*a*), a system for automated data analysis, according to one embodiment of the invention, is shown. A raw data set 500 is input to an automated problem formulation layer 502 to produce a cooked data set 510. The cooked data set, along with further distribution information regarding the raw data set, is input into a first learning engine 504 to produce a model for cooked data 514. The model for cooked data 514, along with the raw data set 500 and the further distribution information regarding the raw data set, is input into a second learning engine 506, to produce a model for raw data 512. Both the model for cooked data 514 and the model for raw data 512 are input into a visualization/explanation tool 508, which can be used by a user (e.g., a data analyst) to examine and visualize the models.

In one embodiment, the system is implemented on a computer, such as that which has been described in the previous section of the detailed description. In such and other embodiments, the raw data set 500, the cooked data set 510, the model for raw data 512, and the model for cooked data 514 can be stored as data on a computer-readable medium, such as a memory or a hard disk drive. Furthermore, in such and other embodiments, each of the layer 502, the first learning engine 504, the second learning engine 506 and the visualization/explanation tool 508 can be a computer program executed by a processor from a computer-readable medium such as a memory. Furthermore, each of these can also be implemented as a software object or component, such as a Component Object Model (COM) object as known within the art.

The raw data set 500 desirably represents a real-world event or events—for example, the stories read by users of a web site, the television shows watched by viewers, etc. The data set includes a plurality of records. Each record has at least one attribute. The set of all attributes is referred to as the attribute set for the problem domain. Each attribute has a default value. The default value for each transactional variable is zero. In general, the data set is desirably such that most attribute values for a given record are equal to the default value, although the invention is not so limited. Each attribute is also referred to as a raw variable. The data and the variables are raw in distinction to the cooked variables and data as will be described, which are abstracted from the raw data and variables. The raw data set can be conceptualized as a table where each row is associated with a particular record (or, sample), and where each column is associated with a particular raw variable.

It is noted that each variable can either be a transactional variable or a non-transactional variable. A transactional variable is a variable that relates to a particular transaction—for example, whether a user has purchased a particular book, whether a user has read a particular story, whether a user has clicked through a particular ad, etc. (although those of ordinary skill within the art will recognize that transactional variables do not necessarily have to be binary). A non-transactional variable is thus any other type of variable—for example, demographic data regarding a user.

The layer 502 receives the data set 500 as an input and performs three functions.

First, the layer 502 abstracts the raw transactional variables into a plurality of cooked transactional variables, as represented by the cooked data set 510. Cooked data is data that is abstracted from the raw data—for example, by organizing, grouping, etc. the raw data into categories. The abstraction of a raw transactional variable into a cooked transactional variable is also referred to as a transformation of the raw variable. Thus, the layer 502 defines and persists a transformation from the raw data set 500 to the cooked data set 510, as what can be referred to as the transformation model. The layer 502 uses this transformation to transform raw samples in the raw data set 500 to cooked samples in the cooked data set 510. The abstraction of raw variables to cooked variables in one embodiment is accomplished as described in a succeeding section of the detailed description, although the invention is not necessarily so limited.

Second, the layer 502 determines the distribution for each raw variable, although in another embodiment, this information is itself provided within the raw data set 500. The determination of the distribution for each raw variable is accomplished as described in succeeding sections of the detailed description. However, the invention is not necessarily so limited.

Third, the layer 502 determines the values of each cooked variable, and the distribution for each cooked variable. The determination of the values of each cooked variable, and of the distribution for each cooked variable in one embodiment is accomplished as described in succeeding sections of the detailed description, although the invention is not necessarily so limited. In one embodiment, the set of values of a cooked variable are equal to the set of values of the corresponding raw variable or variables, although the invention is not so limited. In another embodiment, a data analysis or another user can examine the decisions made by the layer 502 and modify them.

The first learning engine 504 receives as input the cooked data set 510, as well as from the layer 502 the variable distributions for the cooked variables. The engine 504 generates the model for the cooked transactional variables 514 based on the cooked transactional variables and their distributions, in one embodiment. That is, the engine 504 receives the distribution families and the values for the cooked variables from the layer 502 and the cooked data set 510, and produces a model for the cooked data. In one embodiment, the model generated has a type, such as a Bayesian network or a Bayes clustering model. The former is more useful for the task of prediction, while the latter is more useful for the task of clustering. The generation of the cooked variables model 514 in one embodiment is accomplished in accordance with a succeeding section of the detailed description, although the invention is not so limited.

The second leaning engine 506 receives as input the raw data set 500 (including the values for the raw variables), the distributions for the raw variables (from either the layer 502, or from the data set 500), and the model for cooked data 514, and based thereon generates the model for raw variables 512. In one embodiment, the second learning engine 506 generates a model for raw transactional variables based on the model for cooked transactional variables and the type of the model for the cooked transactional variables. In one embodiment, the second learning engine 506 generates the model for cooked data 514 in accordance with a succeeding section of the detailed description, although the invention is not so limited.

Once the models for the raw data 512 and the cooked data 514 have been generated, they can be analyzed using the tool 508. The tool 508 can be a visualization tool, an explanation tool, or both. In one embodiment, the tool is as described in a coassigned and copending patent application entitled "Method and System for Visualization of Clusters and Classifications," Ser. No. 09/104,751, filed on Jun. 25, 1998 (which issued as U.S. Pat. No. 6,216,134), which is hereby incorporated by reference; however, the invention is not so limited. Thus, the tool 508 can be used for predictions and clustering of the data, among other applications. The invention is not limited to any particular tool, however or for utilization for any particular application.

Specific examples of applications for which the tool 508 can be utilized include pattern recognition, data modeling, and data mining. Other specific applications include: predicting what products a person will want to buy given what is already in his or her shopping basket; predicting what ads a person will click on given what other ads he or she has clicked on, what web pages he or she has read, and/or his or her demographics; predicting what television shows a person will want to watch based on other television shows he or she has watched, and/or his or her demographics. Still other specific applications include: predicting a desired song of a user, based on the songs the user has already listened to; predicting a desired music video of a user, based on the music videos the user has already viewed; predicting desired music to be purchased by a user, based on the music the user has already purchased; customizing an electronic newspaper based on the types of stories that user has already read; predicting a desired Internet page of a user; predicting a desired Encarta article of a user; predicting a desired graphical layout of a user for a graphical presentation program; predicting a desired email alias of a user; predicting a desired movie of a user; predicting a desired wine of a user; predicting a desired restaurant of a user; predicting a desired real estate of a user; predicting a desired advertisement of a user; predicting a desired user interface of a user; and, predicting inappropriate material that is deemed unsuitable for viewing by children.

Figure 5A:
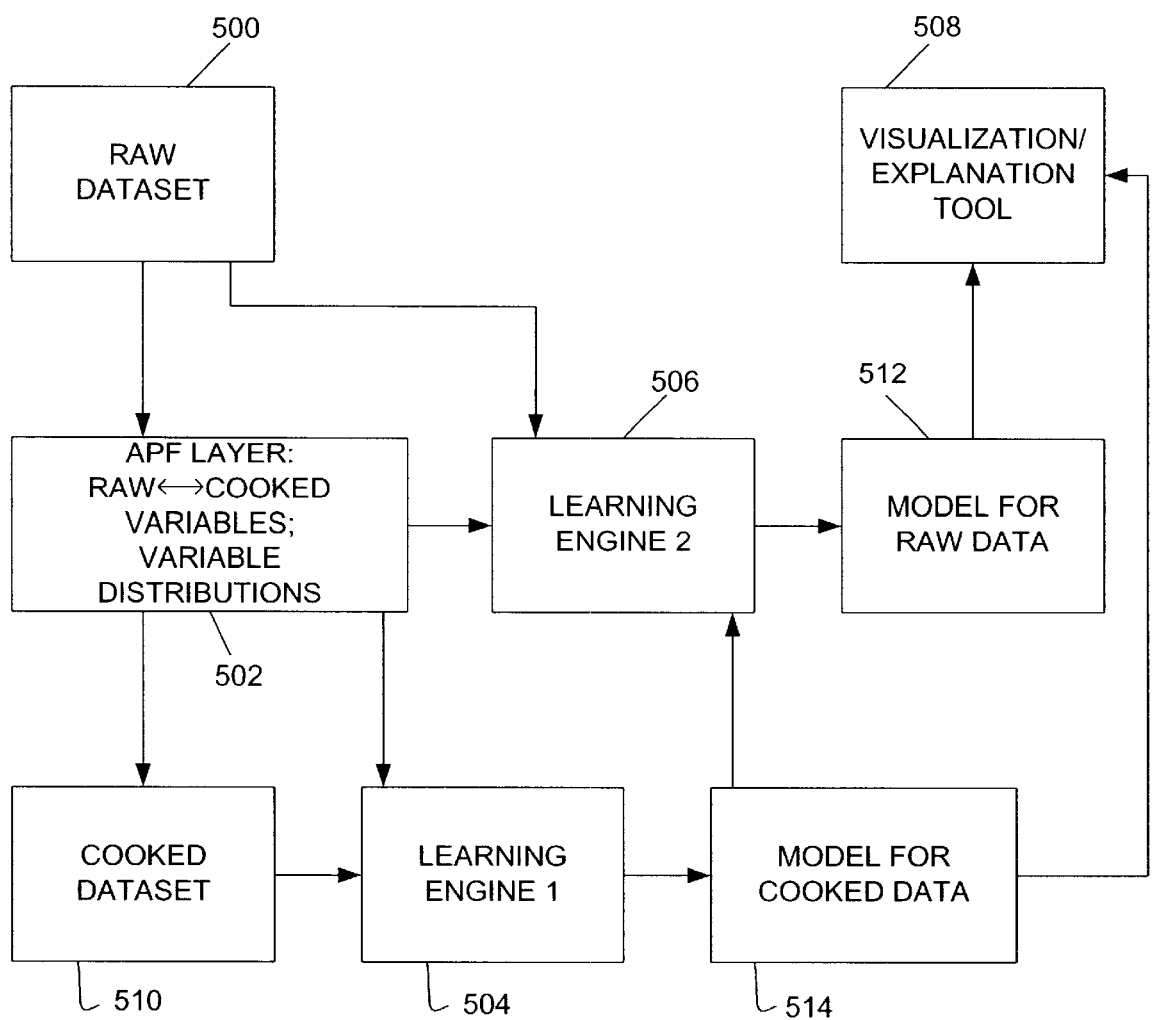
FIG. 5(a) is a diagram of a system for automated data analysis, according to one embodiment of the invention.
Figure 5B:
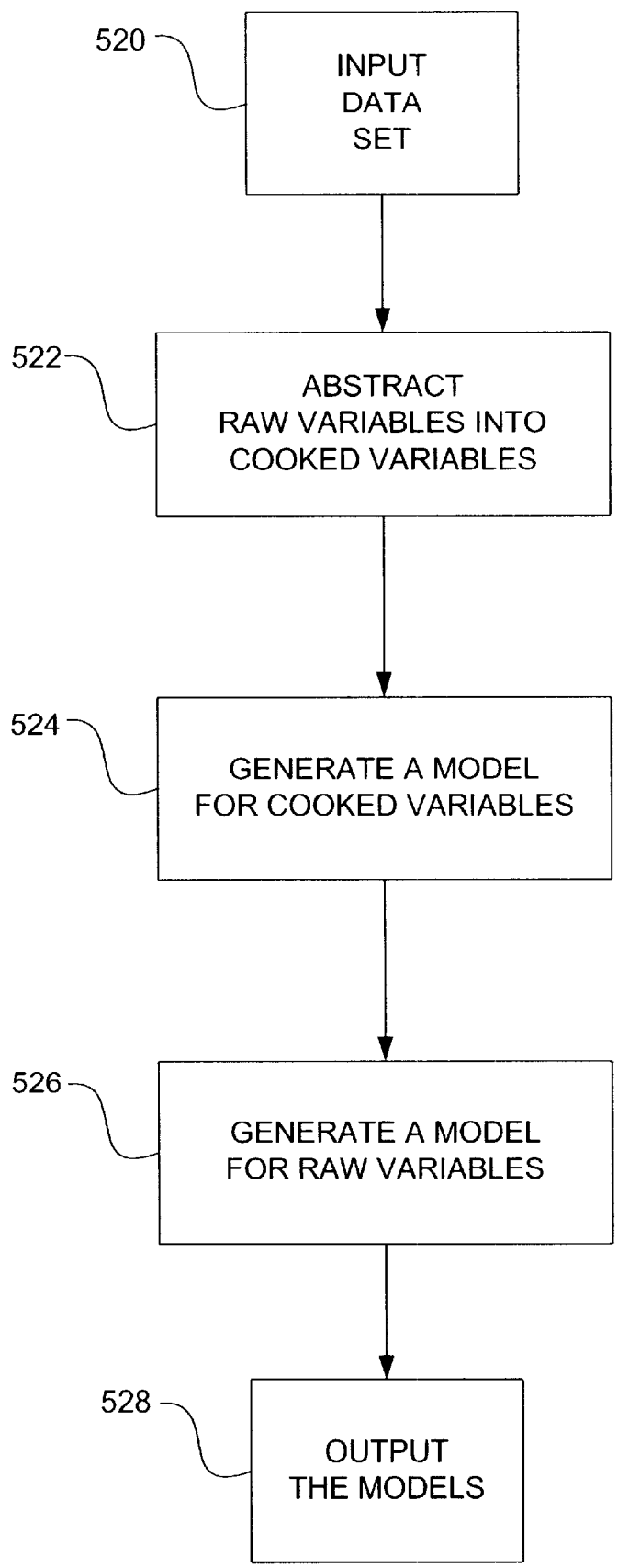
FIG. 5(b) is a flowchart of a method for automated data analysis, according to one embodiment of the invention.

Referring next to FIG. 5(b), a flowchart of a computer-implemented method for automated data analysis, according to an embodiment of the invention, is shown. The computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

In 520, a raw data set is input. The data set may be input by being received from a communications device, from a storage device, etc.; the invention is not so limited. The data set includes a plurality of records, where each record has a value for each of a plurality of raw variables, including raw transactional variables and raw non-transactional variables. In 522, the raw transactional variables are abstracted into a plurality of cooked transactional variables. In one embodiment, this is accomplished as described in a succeeding section of the detailed description. Abstraction of raw to cooked variables is also referred to as transformation of raw to cooked variables, such that in 522, the transformation of raw to cooked variables is persistent.

In 524, a model for the cooked variables is generated, based on at least the cooked transactional variables. In one embodiment, this is accomplished as described in a succeeding section of the detailed description. The model has a type, such as Bayesian network, naïve-Bayes clustering model, etc. In 526, a model for the raw variables is generated, in one embodiment based on at least the model for the cooked variables and the type of the model for the cooked variables. In one embodiment, this is accomplished as described in a succeeding section of the detailed description.

Finally, in 528, at least one of the models generated in 524 and 526 are output. The invention is not limited to the manner by which output is accomplished. For example, in one embodiment, it can be output to a further analysis program or software component, that allows for analysis and conclusions to be drawn. As another example, the output can be displayed on a displayed device, or printed to a printer, etc. Furthermore, in one particular embodiment, output of one or more of the models includes providing a tool to analyze the model or models, such as a visualization tool or an explanation tool. For example, the output can be to utilize the models generated for applications as has been specified in conjunction with FIG. (a).

Abstracting Raw Variables to Cooked Variables

In this section, description is provided for abstracting raw (transactional) variables to cooked (transactional variables). This abstraction is made in one embodiment by the layer 502 of FIG. 5(a). It is noted however, that the invention is not so limited, as those of ordinary skill within the art can appreciate.

As background, a general example is first described. A data set may contain in part a collection of raw variables where each variable represents whether or not a user has purchased a particular science-fiction book. Therefore, a variable can be defined that corresponds to whether or not a user has purchased any science-fiction book. This approach is based on the assumption that a variable hierarchy is available as part of the raw data set. For example, given a data set of book purchases, it is assumed that there is available a hierarchy of books—e.g., the highest level may be fiction versus non-fiction, the level below fiction may be drama versus comedy versus science fiction, etc.

Before providing a description of a computer-implemented method and a computerized system to abstract raw variables to cooked variables, additional background information is first provided. It is noted that enterprise domains have two components, a transactional component, and a non-transactional component, as has been described. Any raw variable that corresponds to data in the transactional component is referred to as a raw transactional variable, while any raw variable that corresponds to data in the non-transactional component is referred to as a raw non-transactional variable. Transactional and non-transactional cooked variables are defined to be abstractions (that is, disjunctions) of raw transactional and raw non-transactional variables, respectively.

Furthermore, it is noted that, in general, within enterprise domains there are many (>~100) transactional variables and few (<~100) non-transactional variables. Thus, in one embodiment of the invention, every non-transactional variable is assumed to be a cooked variable, in general, and variable abstractions are applied only to raw transactional variables.

More specifically, in one embodiment of the invention, it is assumed that every raw transactional variable has values $0, 1, 2, \ldots, k$, where k can be some fixed constant or infinity. For example, a raw transactional variable may represent the number of a particular product a user has purchased, the number of times a user has clicked through an ad, or the number of times a user has read a story on an online news service. Alternatively, a transactional variable may be limited to a binary variable with values 0 and 1—e.g., whether or not a particular product was purchased by a user, whether or not the user clicked through an ad, whether or not a user has read a particular story, etc.

Figure 6A:
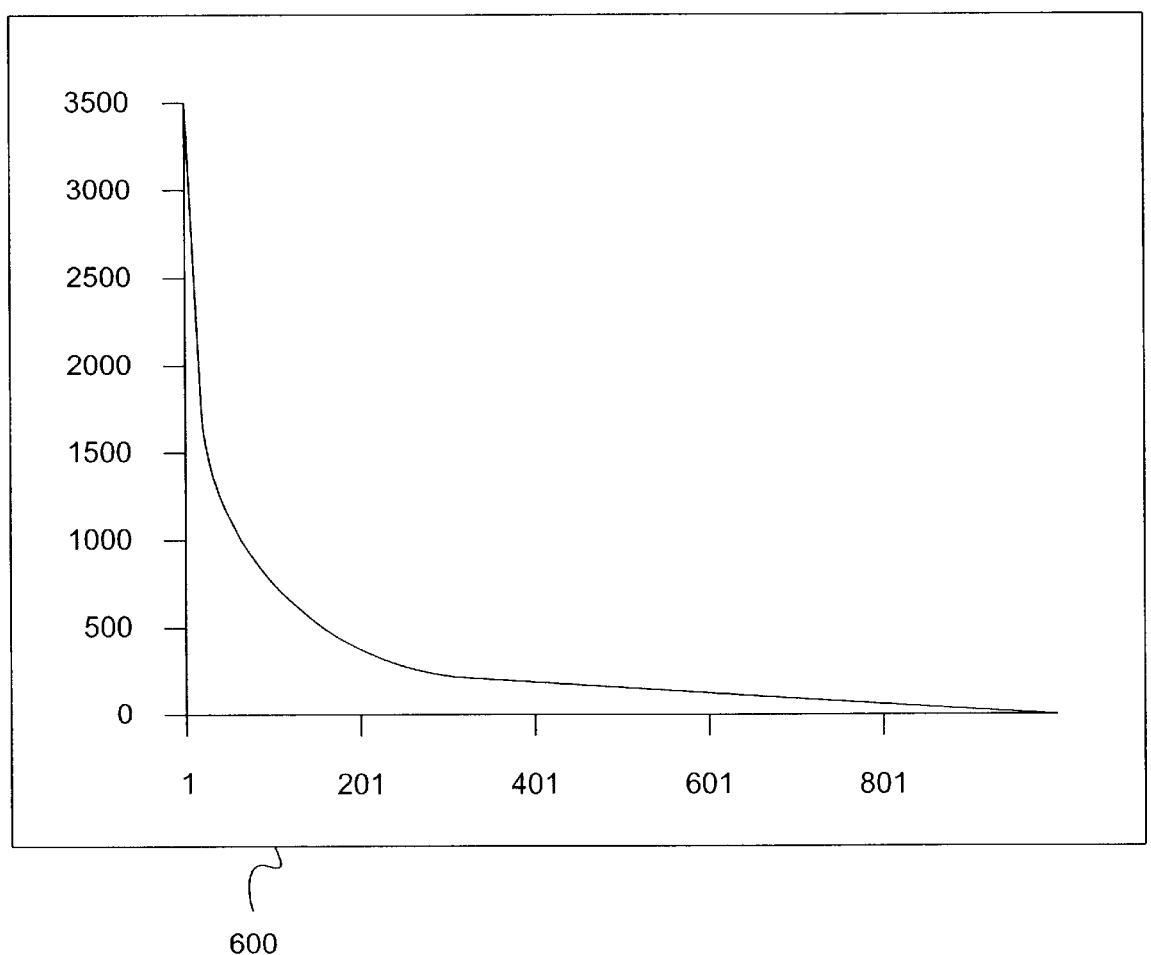
FIG. 6(a) is a diagram showing a decreasing power-law function typical of raw transactional data sets, in accordance with Zipf's law, that can be subjected to embodiments of the invention.

In one embodiment, underlying the approach used herein to abstract cooked variables from raw variables is an observation about transactional data that is known within the art as Zipf's law. If raw transactional variables are ranked by the number of users for which their value is greater than 0 in decreasing order (viz., by their popularity), it is found that this number is a decreasing power-law function of popularity. For example, the curve 600 of FIG. 6(a) is a plot of the number of people who read a particular story on an online news service as a function of the popularity of the story. The curve 600 is a decreasing power-law function, and thus obeys Zipf's law.

Several concepts are now introduced prior to describing a computer-implemented method according to one embodiment of the invention. Given a hierarchy, its concept horizon is a set of concepts such that each concept is either the root node, a node in the hierarchy, or a set of nodes in the hierarchy all of which have the same parent node. A raw variable is said to be in the concept if that raw variable lies (in the hierarchy) under the node or nodes corresponding to the concept. Each concept in a concept horizon defines and thus corresponds to a cooked variable. In particular, the cooked variable defined by a concept is the disjunction of raw variables in the concept. The popularity of a concept is the number of users in the data set (that is, number of records) in the raw data set having values for any raw variable in the concept greater than zero. A refinement of a concept is a set of two concepts such that one of the concepts is a node in the hierarchy (referred to as X), no other node in the original concept is more popular than X, and the two new concepts contain the same raw variables as the original concept. A refinement of a concept horizon is a concept horizon that differs from the original horizon by a single concept refinement.

A computer-implemented method for abstracting cooked transactional variables from raw transactional variables is now described. The method is described in conjunction with FIGS. 6(b) and 6(c), which are flowcharts of the method according to differing embodiments. The computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. After description of the method is provided, an illustrative example is described to further understanding of the method.

Figure 6B:
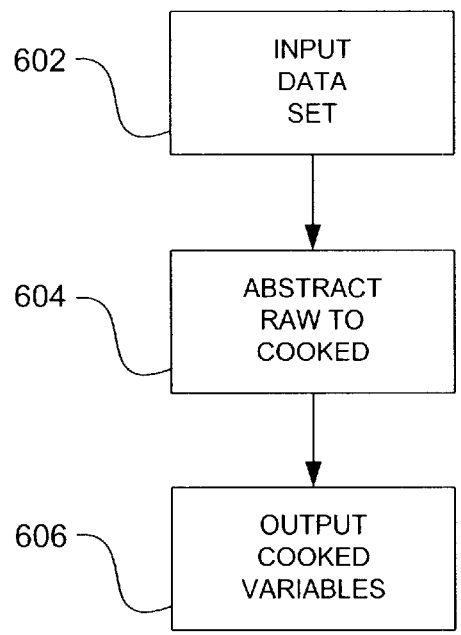
FIGS. 6(b) and 6(c) are flowcharts of methods for abstracting cooked transactional variables from raw transactional variables, according to varying embodiments of the invention.

Referring first to FIG. 6(b), in 602 a data set is input. The data set desirably represents a real-world event or events—for example, the stories read by users of a web site the television shows watched by viewers, etc. The data set includes a plurality of records. Each record has at least one attribute. The set of all attributes is referred to as the attribute set for the problem domain. Each attribute has a default value. In general the data set is desirably such that most attribute values for a given record are equal to the default value, although the invention is not so limited. Each attribute is also referred to as a raw variable, and can be a transactional or a non-transactional variable, as has been described. Thus, each record has a value for each raw transactional variable. The raw variables are desirably organized into a hierarchy of nodes.

In 604, the raw transactional variables are abstracted into a lesser number of cooked transactional variables. In general, this is accomplished by iteratively refining successive most popular concepts that include more than one node, starting at a root node of the hierarchy as an initial concept, into two new concepts until a number of further unrefined concepts is obtained equaling a desired number of cooked transactional variables. Thus, each unrefined concept corresponds to a cooked transactional variable. A more detailed description of 604 will be provided in conjunction with FIG. 6(c), and in conjunction with the illustrative example following the description of FIG. 6(c).

Still referring to FIG. 6(b), however, in 606, the cooked transactional variables are output. The invention is not limited to the manner by which output is accomplished. For example, in one embodiment, it can be output to a further analysis program or software component, that allows for analysis and conclusions to be drawn. As another example, the output can be displayed on a displayed device, or printed to a printer, etc.

Figure 6C:
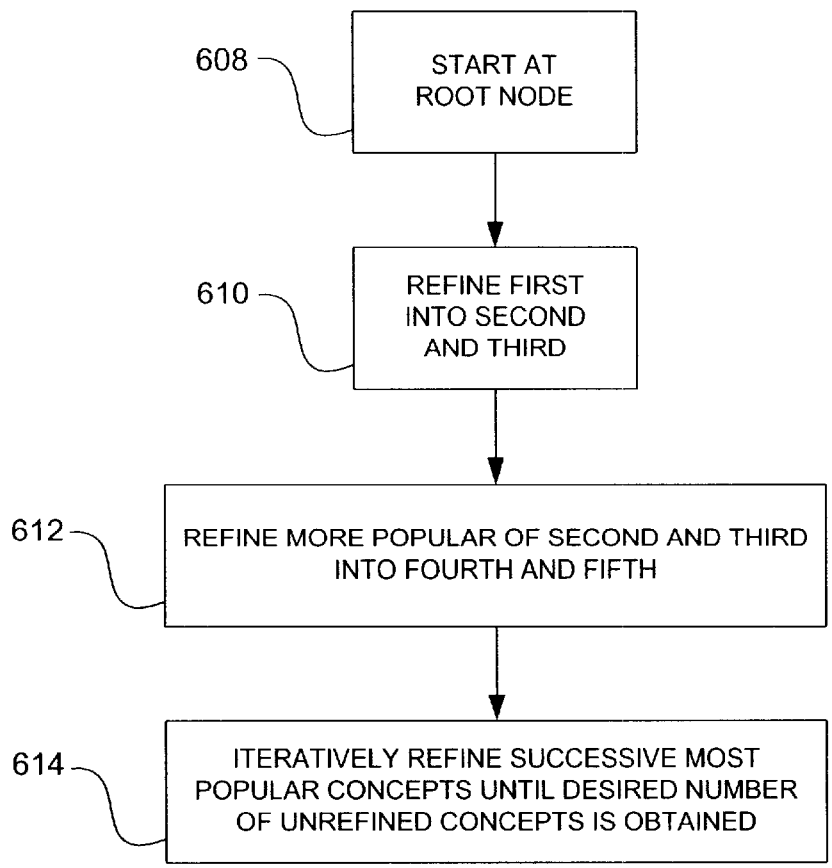

Referring next to FIG. 6(c), a flowchart of a method showing in more detail the abstraction of raw to cooked variables, according to one embodiment of the invention, is provided. For example, in one embodiment, the method of FIG. 6(c) can be executed to abstract the raw to cooked variables in 604 of FIG. 6(b). In 608, the root node of the hierarchy of the raw transactional variables is started at as a first concept. In 610, this first concept is refined into a second concept including a most popular node and a third concept, such that the second concept and the third concept contain all the nodes contained by the first concept.

In 612, the more popular of the second and the third concepts that contains more than one node is refined, into a fourth concept having a most popular node of this more popular concept and a fifth concept, such that the fourth concept and the fifth concept contain the same nodes contained by the more popular of the second and the third concepts. Thereafter, in 614, successive most popular concepts that include more than one node are iteratively refined into two new concepts, until a desired number of further unrefined concepts, corresponding to cooked transactional variables, is obtained.

An example is illustrative in understanding the operation of the methods of FIGS. 6(b) and 6(c). The example is described in conjunction with FIGS. 6(d)–6(i). The example assumes a hypothetical book-purchase data set. The numbers in the FIGS. 6(d)–6(i) are popular concepts. A single-node concept in the concept horizon in any of these figures is denoted by a bold-face name and is also circled. A multiple-node concept in the concept horizon is denoted by a line surrounding multiple bold-face names.

Figure 6D:
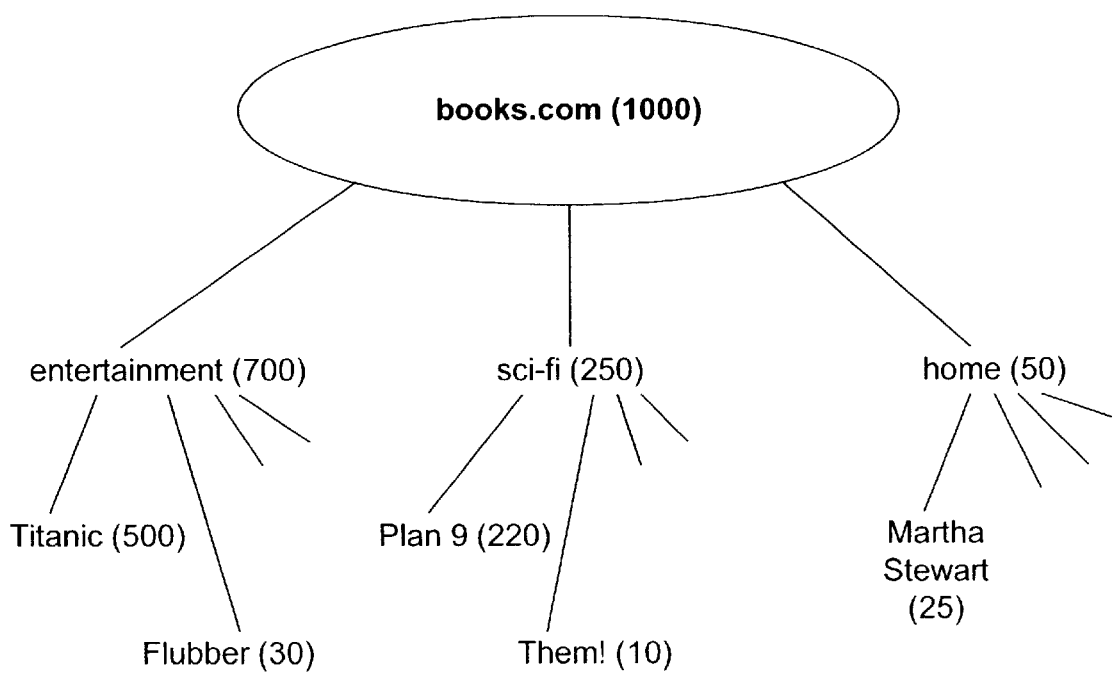
FIGS. 6(d) through 6(i) are diagrams illustrating an example of the application of the methods of FIGS. 6(b) and 6(c), according to one embodiment of the invention, to aid in understanding the methods; and, FIG. 6(j) is a diagram of a system for abstracting cooked transactional variables from raw transactional variables, according to an embodiment of the invention.
Figure 6E:
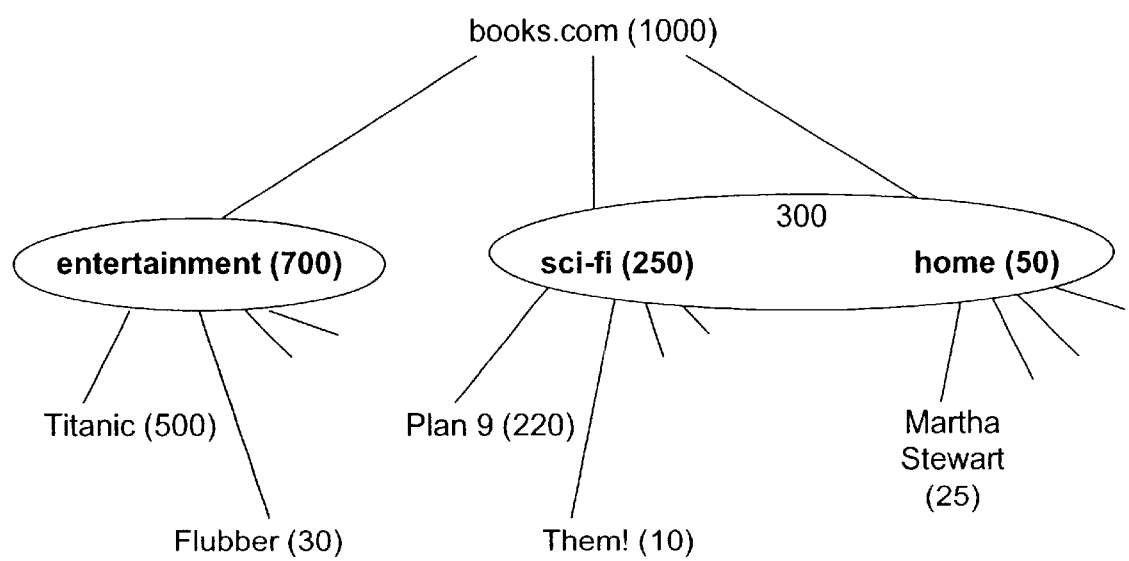
Figure 6F:
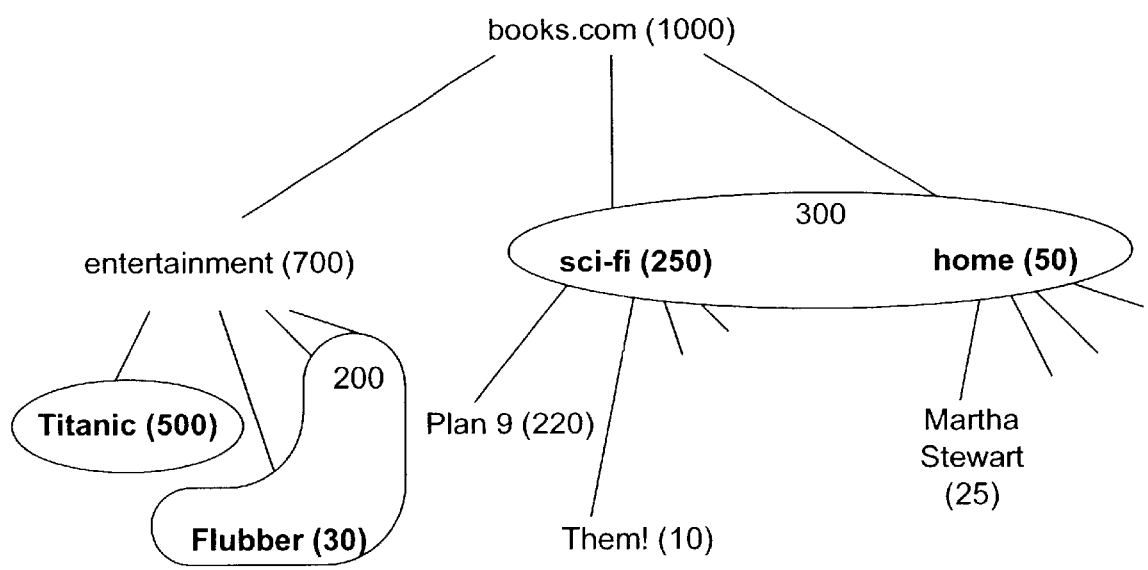
Figure 6G:
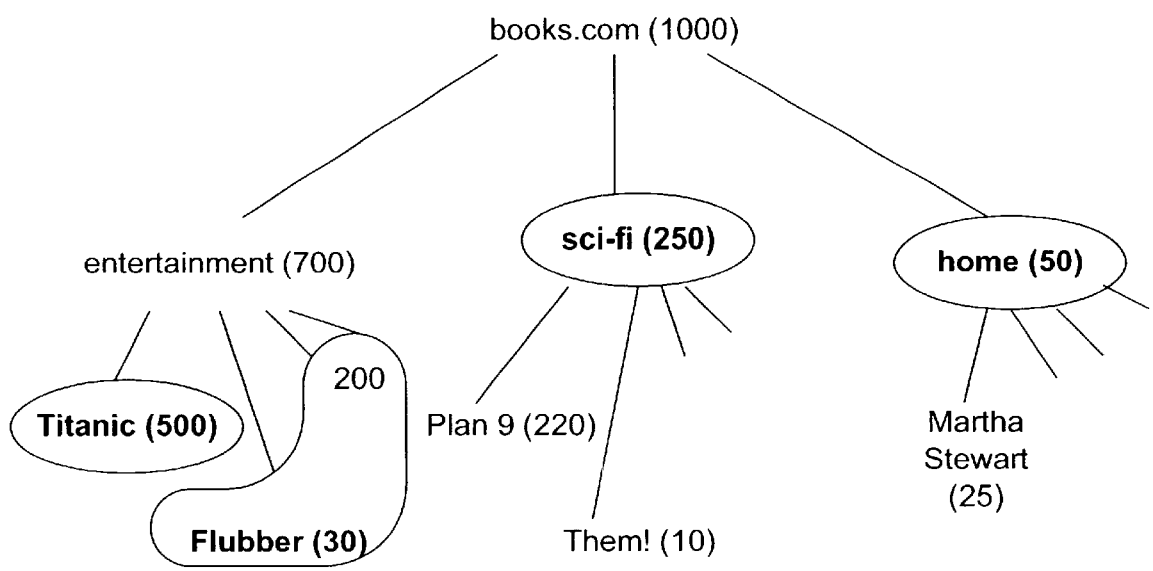
Figure 6H:
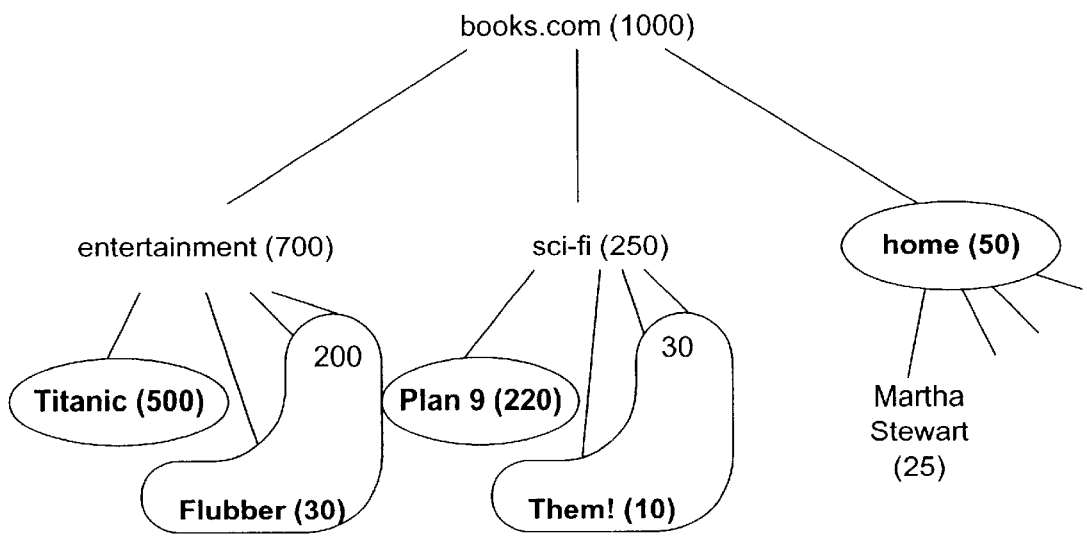
Figure 6I:
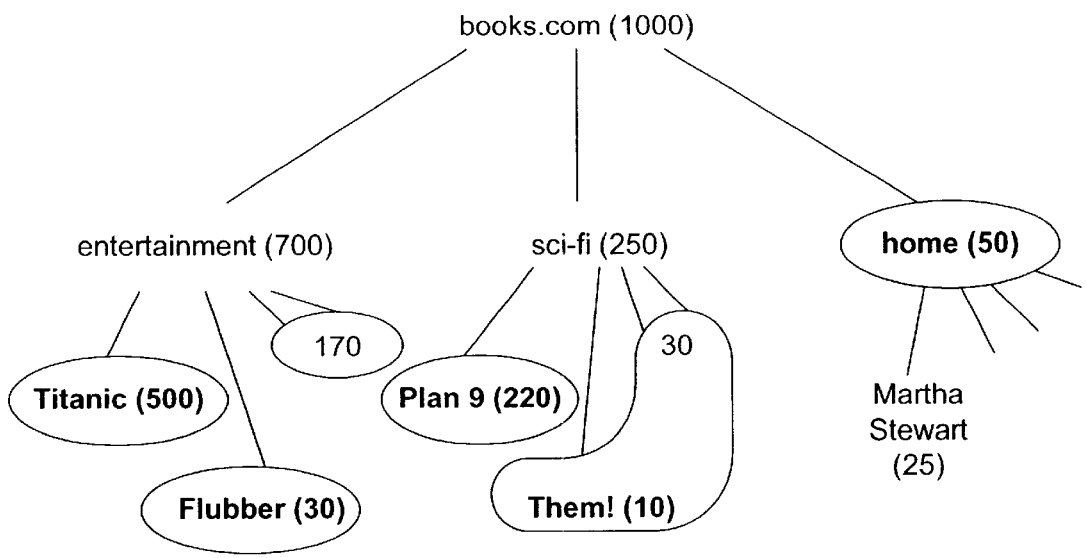

The initial concept horizon is the root node books.com of the hierarchy, as shown in FIG. 6(d). Therefore, this concept horizon is refined into the concepts "entertainment" and {"sci-fi", "home"}, as shown in FIG. 6(e). Of these two, the concept "entertainment" is more popular, so it is refined next, into {"Titanic", and Entertainment not including "Titanic"}, as shown in FIG. 6(f). Thus, there are now the concepts "Titanic," Entertainment not including "Titanic," and {"sci-fi", "home"}. Of these, the concept {"sci-fi", "home"} is most popular, so it is refined next, into "sci-fi" and "home," as shown in FIG. 6(g). Thus, there are now the concepts "Titanic," Entertainment not including "Titanic," "sci-fi," and "home." Of these, "Titanic" cannot be refined any further, because it contains only a single node (i.e., it has no nodes below it). Therefore, the most popular concept having more than a single node is "sci-fi," so it is refined next, as shown in FIG. 6(h). Finally, the concept Entertainment not including "Titanic" is refined, as shown in FIG. 6(i).

Thus, at the end of the refinement process in the example of FIGS. 6(d) through 6(i), assuming that six cooked variables are desired, the cooked variables are "Titanic," "Flubber," Entertainment not including Titanic or Flubber, "Plan 9," Sci-fi not including Plan 9, and "Home."

In one embodiment, a specific algorithm to abstract cooked variables from raw variables is as follows:

---

Algorithm AbstractRaw Variables
   Input: A Hierarchy of raw (transactional) variables
      The number of desired cooked variables (n)
   Output: A set of n variables
   ConceptHiearchy = {Hierarchy.root_node}
   NumberOfVariables = 1
   while NumberOfVariables < n

```
ConceptHierarchy = A refinement of ConceptHierarchy such that
                   a most popular concept is refined
    NumberOfVariables++
End while
Return cooked variables corresponding to ConceptHierarchy
End Algorithm
```

It is noted that some data sets may contain sets of variables that cannot be merged, for example, one set of variables may correspond to the number of products a person has purchased and another set to the number of stories a user has read. In cases such as this one, it is assumed that there is a finite number of abstraction types defined by the data set, and that each raw variable is assigned one such type. If a data set contains more than one abstraction type, then the algorithm is applied as above to each abstraction type separately.

Figure 6J:
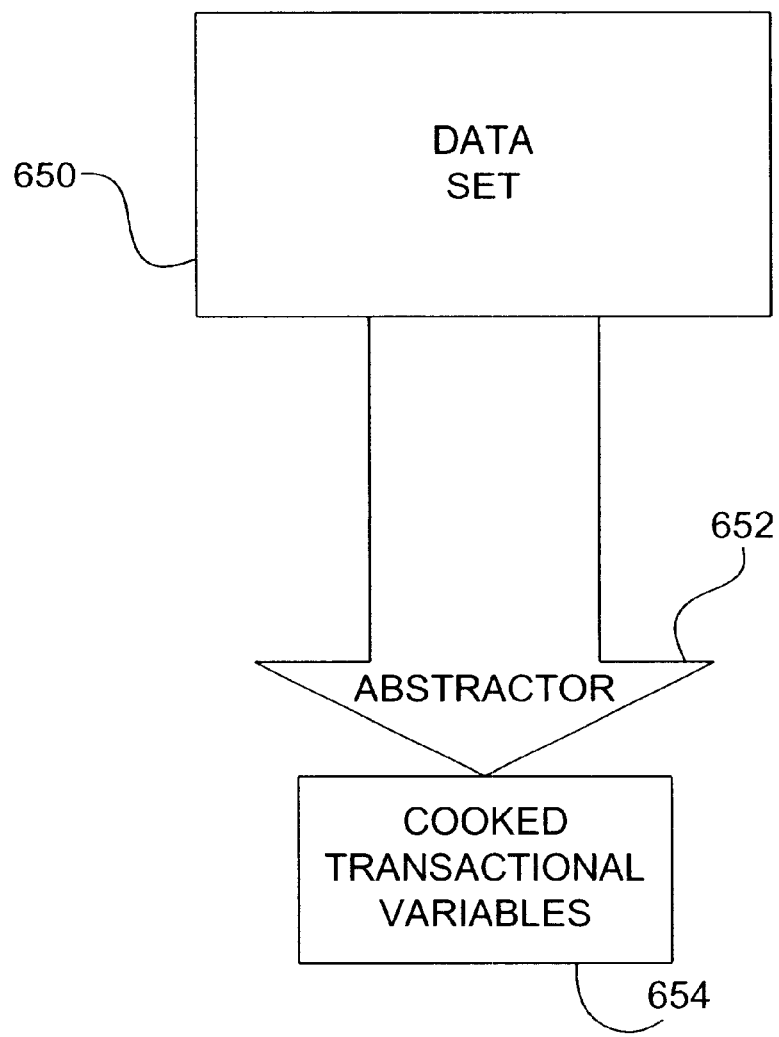

Referring now to FIG. 6(j), a system to abstract cooked variables from raw variables according to one embodiment of the invention is shown. The system of FIG. 6(j) includes a data set 650, an abstractor 652, and cooked transactional variables 654. Each of the data set 650 and the cooked transactional variables 654 can in one embodiment be stored as data on a computer-readable medium, such as a memory or a hard drive. The abstractor 652 can in one embodiment be a computer program, executable by a processor from a computer-readable medium. The invention is not so limited, however.

The data set 650 desirably represents a real-world event or events—for example, the stories read by users of a web site, the television shows watched by viewers, etc. The data set includes a plurality of records. Each record has at least one attribute. The set of all attributes is referred to as the attribute set for the problem domain. Each attribute has a default value. In general, the data set is desirably such that most attribute values for a given record are equal to the default value, although the invention is not so limited. Each attribute is also referred to as a raw variable, and can be a transactional or a non-transactional variable, as has been described. Thus, each record has a value for each raw transactional variable. The raw variables are desirably organized into a hierarchy of nodes.

Furthermore, the abstractor 652 abstracts the cooked transactional variables 654 from the raw transactional variables in the data set 650. In one embodiment, this is accomplished in accordance with the methods of FIG. 6(b) and FIG. 6(c) that have been described. Thus, the result is the cooked transactional variables 654, as has also been described in conjunction with FIG. 6(b) and FIG. 6(c).

Once cooked variables have been abstracted, for example, by the layer 502 of FIG. 5(a), then the distribution family must be determined for each cooked variable—for example, again by the layer 502 of FIG. 5(a). For non-transactional variables, this is accomplished as is described in the following sections of the detailed description. For transactional variables, it is accomplished as is now described.

If a raw or cooked transactional variable has a number of values j or less, where j is predetermined, then it is modeled with a multinomial distribution, as known within the art. If it has more than j values, then it is modeled with a binomial log-Gaussian distribution, as also known within the art. The binomial distribution is specifically used to model whether or not the value of the variable is zero, and the log-Gaussian distribution is specifically used to model the logarithm of the variable's value for those samples where the value is greater than zero. In one embodiment, j is equal to 7.

As has been described in this section of the detailed description, it is assumed that a user desires predictions for all raw variables. However, in some situations, as can be appreciated by those of ordinary skill within the art, users may desire predictions for only a subset of all the raw variables. For example, in a book-purchase application, users may desire predictions for only entertainment-related books, only sci-fi-related books, or only home-related books. In such situations, the methods and algorithms described above can be modified such that a certain number of concepts underlying each category that a user may select is forced, assuming that the category hierarchy available to the user is compatible with the hierarchy used for variable abstraction.

Generating a Model for Raw Variables from a Model for Cooked Variables

In this section, description is provided for generating a model for raw (transactional) variables from a previously generated model for cooked (generated) variables, as these terms have been previously defined. This generation is made in one embodiment by the second learning engine 512 of FIG. 5(a). Thus, the second learning engine receives the raw data, the distribution families and values for the raw variables, and the model for cooked data, and then creates a model for raw variables. It is noted, however, that the generation of a model for raw variables in accordance with this section is not limited to implementation by a learning engine such as the second learning engine 512 of FIG. 5(a), as those of ordinary skill within the art can appreciate.

Figure 4A:
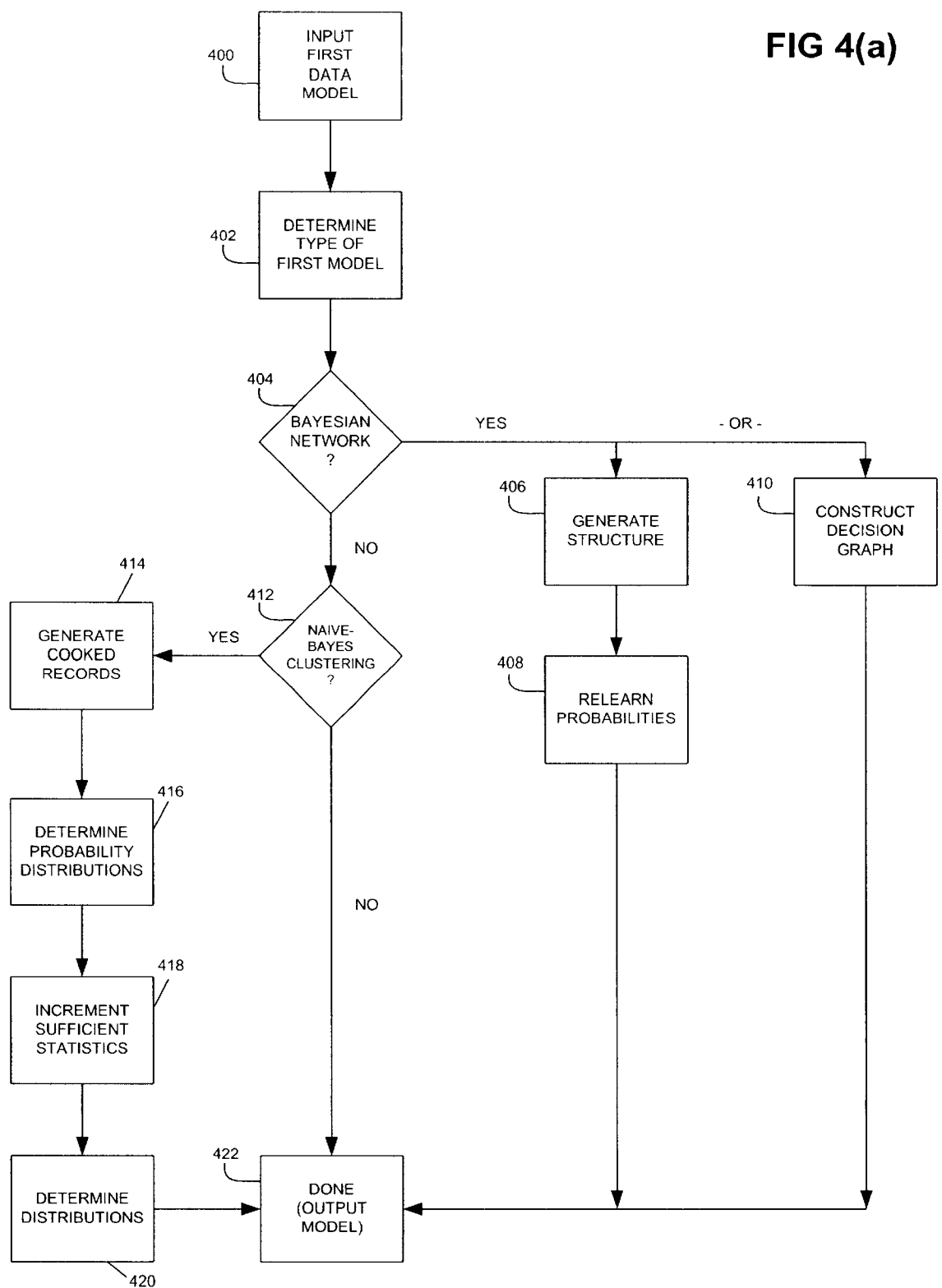
FIG. 4(a) is a flowchart of a method to generate a model for raw variables from a model for cooked variables, according to one embodiment of the invention.

A computer-implemented method is now described, in conjunction with and in reference to FIG. 4(a). The computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

In 400, a first data model is input. The first data model is for a plurality of cooked transactional variables abstracted from a plurality of raw transactional variables for a data set, that may have already been generated. The data set itself desirably represents a real-world event or events—for example, the stories read by users of a web site, the television shows watched by viewers, etc. The data set includes a plurality of records. Each record has at least one attribute. The set of all attributes is referred to as the attribute set for the problem domain. Each attribute has a default value. In general, the data set is desirably such that most attribute values for a given record are equal to the default value, although the invention is not so limited. Each attribute is also referred to as a raw variable, and can be a transactional or a non-transactional variable, as has been described. Thus, each record has a value for each raw transactional variable.

In 402, the type of the first data model for the cooked transactional variables is determined. In the embodiment of FIG. 4(a), the type may be one of two different types: a Bayesian network, and a naïve-Bayes clustering model. More specifically, in the former case, there is a Bayesian network in the local distribution for each variable, consisting of a decision graph, as known within the art. The network may be cyclic or acyclic, as those of ordinary skill within the art can appreciate.

Next, a second data model, for the raw transactional variables, is generated, based on the first data model and its type. 404, 406, 408, 410, 412, 414, 416, 418, 420 and 422 in the method of FIG. 4(a) are performed to generate the second data model in one embodiment. The invention itself, however, is not necessarily so limited.

First, in 404, if the first data model is of a Bayesian network type, then the method proceeds to either 406 or 410, in accordance with different embodiments of the invention. If the embodiment starting with 406 is desired, then in 406 and 408 a second data model is created such that the second data model is also of a Bayesian network type, such that there is a Bayesian network in the local distribution for each raw variable consisting of a decision graph, as those of ordinary skill within the art can appreciate.

Constructing the decision graph for the local distribution of each raw transactional variable is performed in 406 and 408 specifically. In 406, the structure of the decision graph for the local distribution of the raw transactional variable is generated, copying the structure of the decision graph of the local distribution of the cooked transactional variable that encompasses the raw transactional variable (that is, the cooked transactional variable abstracted from raw transactional variables include this raw transactional variable). Next, in 408, the probabilities of each of a plurality of leaves of the decision graph for the raw transactional graph is relearned using (that is, based on) the plurality of raw transactional variables, as understood by those of ordinary skill within the art. In one embodiment, these probabilities can be smoothed, as known within the art. Thus, the resulting decision graph for each raw transactional variable has a structure copied from a cooked transactional variable encompassing the raw transactional variable, but having different (relearned) probabilities, based on the raw transactional variables themselves. In this manner, a second data model, for the raw transactional variables, is created.

In another embodiment of the invention, starting with 410, a second data model for the raw transactional variables is generated in a different manner. In 410, a decision graph for each raw variable is also created, but not by copying the structure of the cooked transactional variable encompassing the raw variable. Rather, each decision graph is created de novo, using only those raw variables that appear in the decision graph for the cooked variable that encompasses the raw variable for which the decision graph is being created, as understood by those of ordinary skill within the art. That is, a decision graph is constructed for a local distribution of each raw transactional variable, based only on those raw transactional variables appearing in the decision graph of the local distribution of the cooked transactional variable encompassing the raw transactional variable.

If the first data model has a type not of a Bayesian network type, then the method instead proceeds from 404 to 412. In 412, it is determined whether the first data model is of a naïve-Bayes clustering type. If so, then the method of FIG. 4(a) proceeds to 414. In 414, 416, 418 and 420, a second data model, for the raw transactional variables, is generated, also of a naïve-Bayes clustering type. 414, 416, and 418 are performed for each record of the data set, and then 420 is performed.

In 414, each raw sample (that is, a record of the data set) is translated to a corresponding cooked sample (that is, a corresponding cooked record) based on a predetermined transformation of the plurality of raw transactional variables to the plurality of cooked transactional variables, as those of ordinary skill within the art can appreciate. In one embodiment, this predetermined transformation is performed by the layer 502 of FIG. 5(a), although the invention is not so limited.

In 416, the cooked sample is input to the first model for the cooked variables, to determine the probability distribution of cluster membership of the sample, as can be appreciated by those of ordinary skill within the art. That is, a probability distribution of the corresponding cooked record is determined, based on the first data model.

In 418, the sufficient statistics for the evolving second model for the raw data is incremented, according to the distribution of cluster membership, as can be appreciated by those of ordinary skill within the art. That is, the sufficient statistics for the second data model are incremented, according to the probability distribution determined in 416. For example, if p(cluster j | cooked sample) is 0.7, and if discrete raw variable i has value k in the corresponding cooked sample, then the count for raw variable i in cluster j is incremented by 0.7.

Once all the raw records have been processed in 414, 416 and 418, then in 420, the distribution of the naïve-Bayes model for the raw variables (that is, the second model) are determined from the sufficient statistics that have been accumulated in the iterations of 418. That is, the distributions of the second data model are determined from the sufficient statistics for the second data model, as can be appreciated by those of ordinary skill within the art. In one particular embodiment, determining the distributions of the second model is also based on a prior distribution, using standard statistical techniques known within the art, in addition to the sufficient statistics, although the invention is not so limited.

In still another embodiment of the invention, a second data model is generated as follows (in lieu of performance of 406 and 408, performance of 410, or performance of 414, 416, 418 and 420, and not specifically shown in FIG. 4(a)). In this embodiment, a first model for cooked variables is not initially generated; instead, the second model is built directly from inputs of the raw and the cooked data. First a Bayesian network is built, where each local distribution includes a decision graph, as has been described. For each raw variable, the decision graph is generated utilizing the cooked variables as the input variables (as opposed to the raw variables). In one embodiment, however, if the raw variable for which a decision graph is being generated is included in one of the cooked input variables, then that raw variable is removed from the cooked variable for that decision graph. For example, if a decision graph is being built for the raw variable corresponding to the book "Armageddon," and one of the cooked variables is "Sci Fi books" inclusive of this book, then for the purposes of building the decision graph for "Armageddon," the cooked variable is modified to be "Sci Fi books except Armageddon."

Once a second data model has been generated, either by performance of 406 and 408, performance of 410, performance of 414, 416, 418 and 420, or by the method just described, then the method proceeds to 422. In 422, the second data model is output. The invention is not limited to the manner by which output is accomplished. For example, in one embodiment, it can be output to a further analysis program or software component, that allows for analysis and conclusions to be drawn. As another example, the output can be displayed on a displayed device, or printed to a printer, etc. It is noted that, however, if the first model was not a Bayesian network type or a naïve-Bayes clustering type, then the method proceeds to 422 without generation of a second data model. In this case, an error message can be generated in 422, in one embodiment.

Figure 4B:
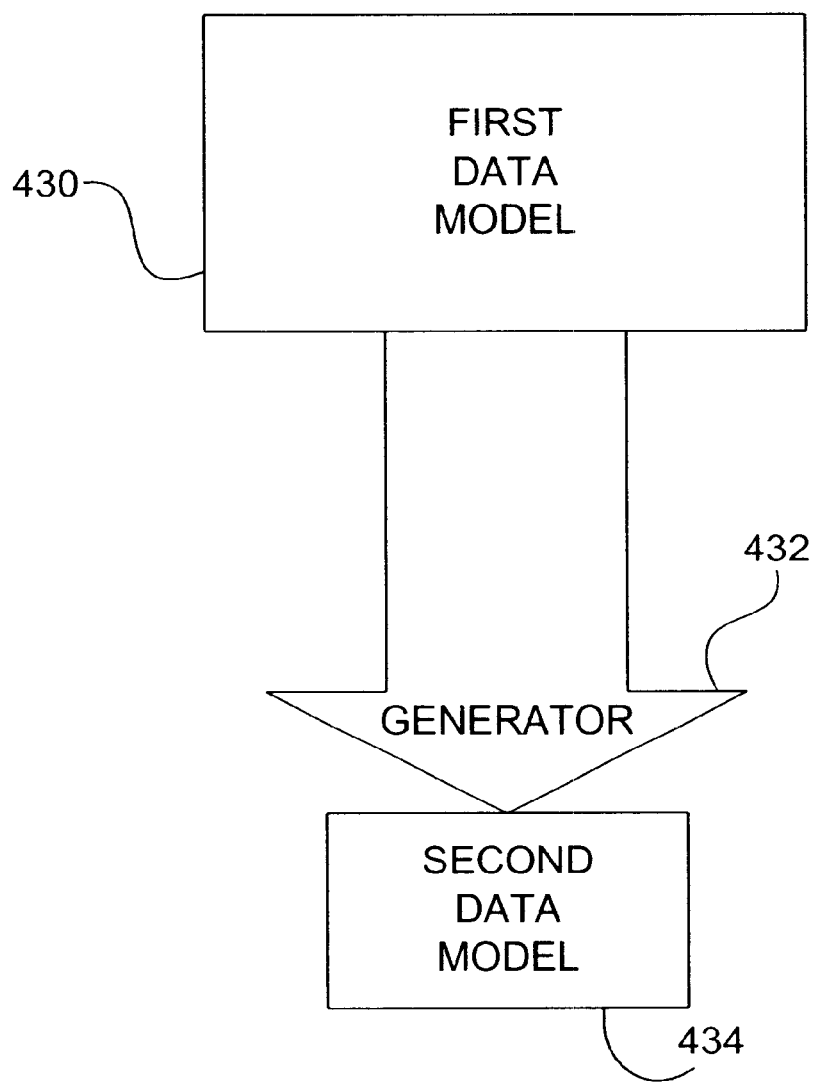
FIG. 4(b) is a diagram of a system to generate a model for raw variables from a model for cooked variables, according to one embodiment of the invention.

Furthermore, it is noted that whereas a Bayesian network (decision graph) model for raw variables can be easily used for prediction purposes, as those of ordinary skill within the art are aware, a naïve-Bayes clustering model for raw variables constructed in accordance with 414, 416, 418 and 420 of FIG. 4(*a*) cannot. Instead, the naïve-Bayes clustering models for both the raw and cooked variables (that is, both the first and the second data models) must be used in concert to make predictions, as follows. First, the raw sample is translated to the cooked sample according to a predetermined transformation, and presented to the model for the cooked variables (the first model). This model, in turn, is used to determine the distribution of cluster membership of the sample. Finally, the prediction for a particular variable is made by averaging the per-cluster predictions (that is, the conditional distributions) in the naïve-Bayes model for the raw variables, using the distribution of cluster membership for averaging.

A system to generate a model for raw variables from a model for cooked variables is now described, in conjunction with FIG. 4(*b*). The system of FIG. 4(*b*) includes a first data model for cooked variables 430, a generator 432, and a second data model for raw variables 434. Each of the data models 430 and 434 can in one embodiment be stored as data on a computer-readable medium, such as a memory or a hard drive. The generator 432 can in one embodiment be a computer program, executable by a processor from a computer-readable medium. The invention is not so limited, however.

The first data model for cooked variables 430 is such that the cooked variables have previously been abstracted from raw transactional variables, where the raw transactional variables are based on a data set of a plurality of records (each record having a value for each raw variable). The generator 432 generates the second data model for raw variables 434 based on the first data model 430, and a type of the first data model (e.g., Bayesian network, naïve-Bayes clustering, etc.). In one embodiment, this is accomplished in accordance with the method of FIG. 4(*a*) that has been described. Thus, the result is a second data model for raw variables 434, as has also been described in conjunction with FIG. 4(*a*).

Determining Whether a Variable Is Numeric or Non-Numeric

In this section, description is provided as to determining whether a variable is numeric or non-numeric. This determination is made by the layer 502 of FIG. 5(*a*) in one embodiment to determine what distribution family to use for non-transactional variables. For example, if the variable is numeric, then in accordance with the next section of the detailed description, a Gaussian or a log-Gaussian distribution is used for that variable. As a further example, if a variable is deemed to be non-numeric, then a multinomial distribution is utilized. However, it is noted that the invention is not so limited to this application for the determination described in this section as to whether a variable is numeric or non-numeric.

In general, it is noted that a fundamental distinction that can be made about a variable as to whether or not it is numeric. An example of a numeric variable is age, while an example of a non-numeric variable is occupation. In general, the numeric/non-numeric distinction is not necessarily related to whether or not the values of the variable are numbers. The values of any variable can be encoded numerically. Thus, the numeric/non-numeric distinction has to do with whether or not adjacent values have some similarity. For example, a subtle example of a non-numeric variable is area code. Although the values of this variable are numbers, the variable is non-numeric, because adjacent values are unrelated (for example, 212 is for New York, while 213 is for Los Angeles). In contrast, zip code is a numeric value, because if two zip codes have close to the same value, then the regions in the United States represented by those zip codes are physically close.

An example of numeric versus non-numeric variables is shown in FIG. 2(*a*) and FIG. 2(*b*). In the histogram 200 of FIG. 2(*a*), counts for adjacent values are close, hence representing a numeric variable. Conversely, in the histogram 202 of FIG. 2(*b*), counts for adjacent values are far apart, hence representing a non-numeric variable.

A computer-implemented method for determining whether a variable is numeric or non-numeric is now described, in conjunction with and reference to FIG. 2(*c*). The computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

In 204, a variable having a plurality of values is input, where each value has a count. The variable in one embodiment is a non-transactional variable. The count for each value is in one embodiment the number of records within a data set that has that value for the variable. For example, a variable may have the values 1, 2, 3, with corresponding counts of 10, 15, 5. This means that in one embodiment, 10 records have the value 1 for the variable, 15 records have the value 2 for the variable, and 5 records have the value 3 for the variable.

Next, it is determined whether the variable is numeric or non-numeric, by assessing the closeness of counts for adjacent values of the variable, as has been described in conjunction with FIGS. 2(*a*) and 2(*b*). 206, 208, 210, 212, 214, 216, 218 and 220 of FIG. 2(*c*) in the method of FIG. 2(*c*) are performed to make this determination in one embodiment. The invention itself, however, is not necessarily so limited.

First, in 206, it is determined whether any value of the variable has a non-numeric name. For example, a variable may have the values 2, 4, 8, 10, which are all numeric values. Conversely, a variable may have as one of its values "red" or "blue," which is a non-numeric value. If any value of the variable is determined to have a non-numeric name, then the method proceeds to 208, where it is deemed that the variable itself is non-numeric. (However, in one embodiment, if there are more than a predetermined number of values for the variable, such as over 100 values, and any of the values have a non-numeric name, then the variable is instead deemed rejected, and is not used. Furthermore, in one embodiment, if there is only one value of the variable, regardless of whether it has a numeric or non-numeric name, then the variable is also deemed rejected, and is not used.)

Otherwise, in 210, it is determined whether the total number of values for the variable is greater than a first predetermined threshold. In one embodiment, this threshold is 100 values. Thus, if the number of different values for the variable is greater than 100, then the method proceeds to 212, where it is deemed that the variable is numeric.

Otherwise, in 214, it is determined whether the total number of values for the variable is less than a second predetermined threshold. In one embodiment, this threshold is 8 values. Thus, if the number of different values for the variable is less than 8, then the method proceeds to 216, where it is deemed that the variable is non-numeric.

Thus, the checks performed in 206, 210 and 214 first determine whether all the values of the variable have numeric names; if any are not, then the variable is non-numeric. If there are more than 100 values (in one embodiment), then the variable is assumed to be numeric, while if there are less than 8 values (in one embodiment), then the variable is assumed to be non-numeric. If there are between 9 and 99 values (in one embodiment), then a statistical analysis is performed to determine whether the variable is numeric or non-numeric.

In one embodiment, the statistical analysis performed in 218 is as follows, although the invention is not so limited. The statistical analysis is of a histogram of the values of the variable, such as the histograms of FIGS. 2(a) and 2(b) that have been described. First, a first sum of the counts of the values of the variables is calculated. The counts are then randomly permutated, and a second sum of the counts of the values are recalculated A mean and a standard deviation of the second sum are determined, and based thereon, the variable is determined to be numeric or non-numeric. In one embodiment, this determination is made by determining whether the mean minus the first sum is greater than two times the standard deviation; if so, then the variable is determined to be numeric, otherwise the variable is determined to be non-numeric.

Figure 2A:
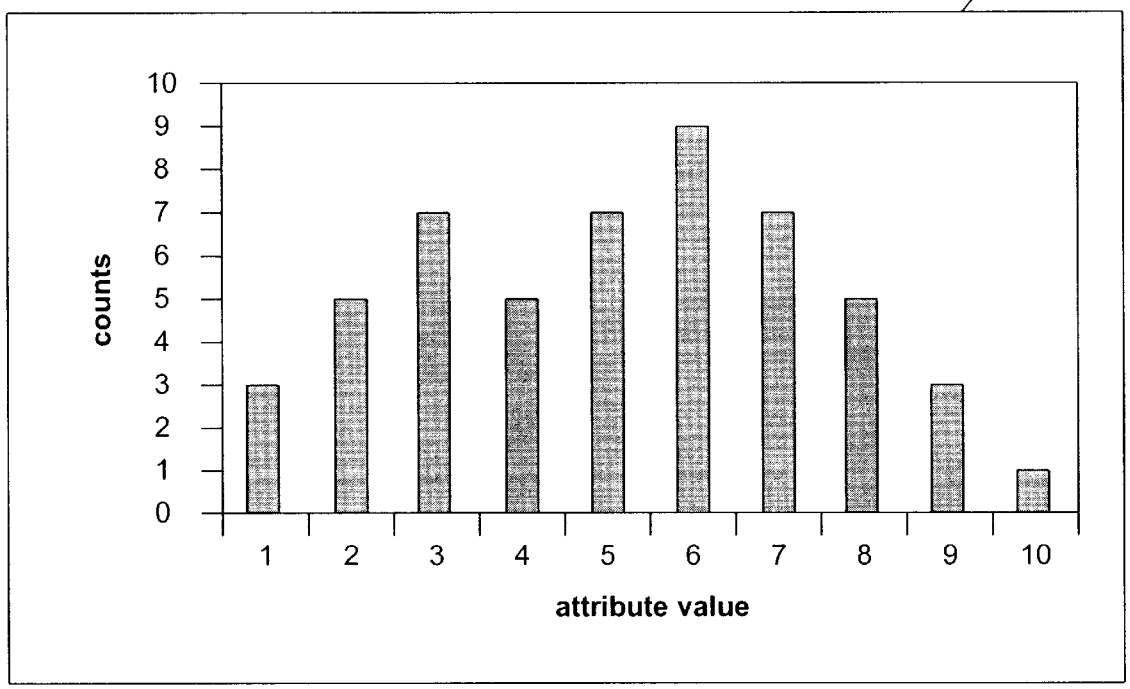
FIG. 2(a) and FIG. 2(b) are diagrams of histograms of a numeric variable and a non-numeric variable, respectively.
Figure 2B:
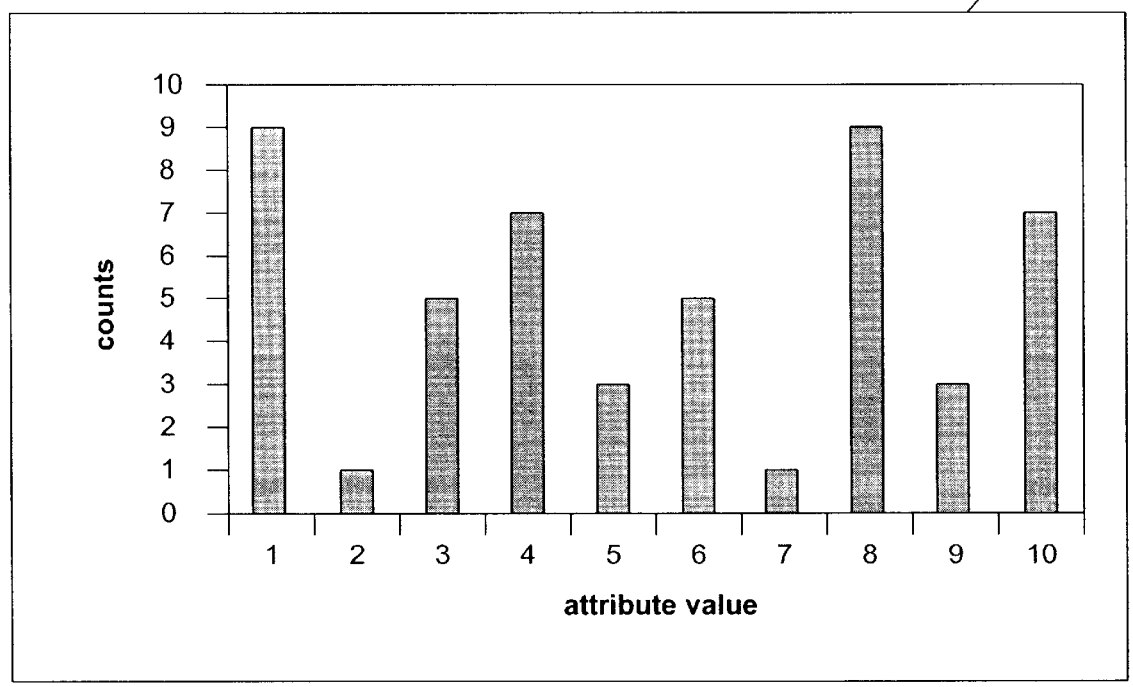
Figure 2C:
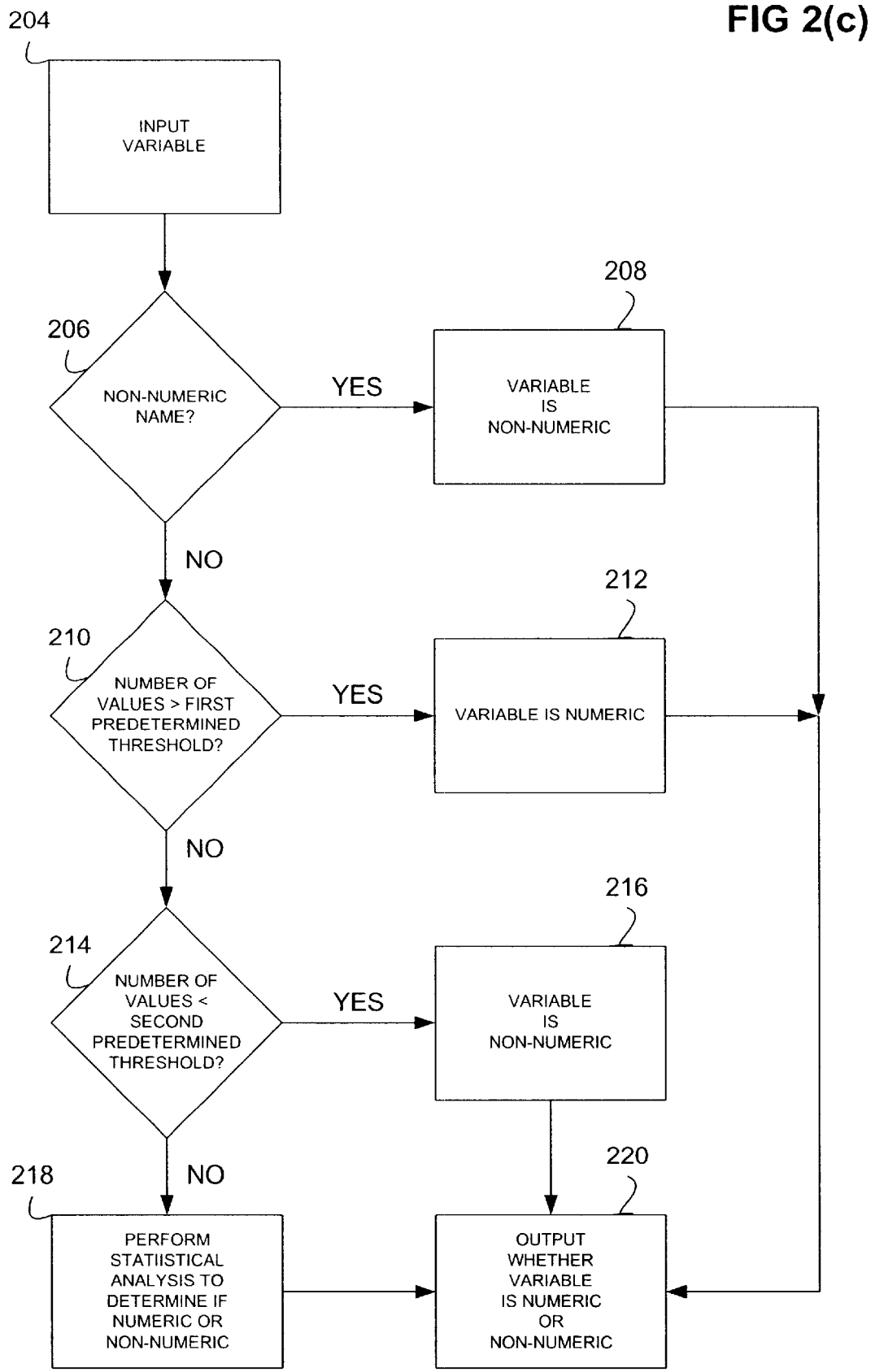
FIG. 2(c) is a flowchart of a method to determine whether a variable is numeric or non-numeric, according to one embodiment of the invention.

Still referring to FIG. 2(c), once the variable has been determined to be numeric or non-numeric in 208, 212, 216 or 218, the method proceeds to 220, where whether the variable is numeric or non-numeric is output. The invention is not limited to the manner by which output is accomplished. For example, in one embodiment, it can be output to a further analysis program or software component, that allows for analysis and conclusions to be drawn. As another example, the output can be displayed on a displayed device, or printed to a printer, etc.

In one embodiment, a specific algorithm to determine whether a variable is numeric or non-numeric is as follows:

```
MainRoutine:
Input: A variable
Output: A decision as to whether the input variable is numeric,
   non-numeric, or rejected
d == the number of distinct values of the variable
(including "missing")
If d = 1 then return "rejected"
If some of the values of the variable (excluding "missing")
have a non-numeric name
      If d > 100 then return "rejected"
      Else return "non-numeric"
Else
      If d < 8 then return "non-numeric"
      Else if d > 100 then return "numeric"
      Else return the decision made by SubRoutine
End MainRoutine
```

```
SubRoutine:
Input: An variable with 8–100 distinct numeric values
Output: A decision as to whether variable is non-numeric,
numeric, or rejected
Build a histogram that excludes the missing value (value 0).
   That is, count how many users have
   variable=value 1 . . . , variable=value d-1.
   These counts can be obtained at the same time d is determined
   in MainRoutine.
InitialSum == sum_{i=1}^{d-2} |count(value i) - count(value i+1)|
For j = 1 to 10
   Randomly permute the counts 1 through d-1
   PermSum[j]== sum_{i=1}^{d-2} |count(value i) -
   count(value i+1)|
```

-continued

```
Mean == Average ofPermSum[ ]
StdDev == Standard deviation of PermSum[ ]
If (Mean-InitialSum) > 2*StedDev then return "numeric"
Else return "non-numeric"
End SubRoutine
```

Figure 2D:
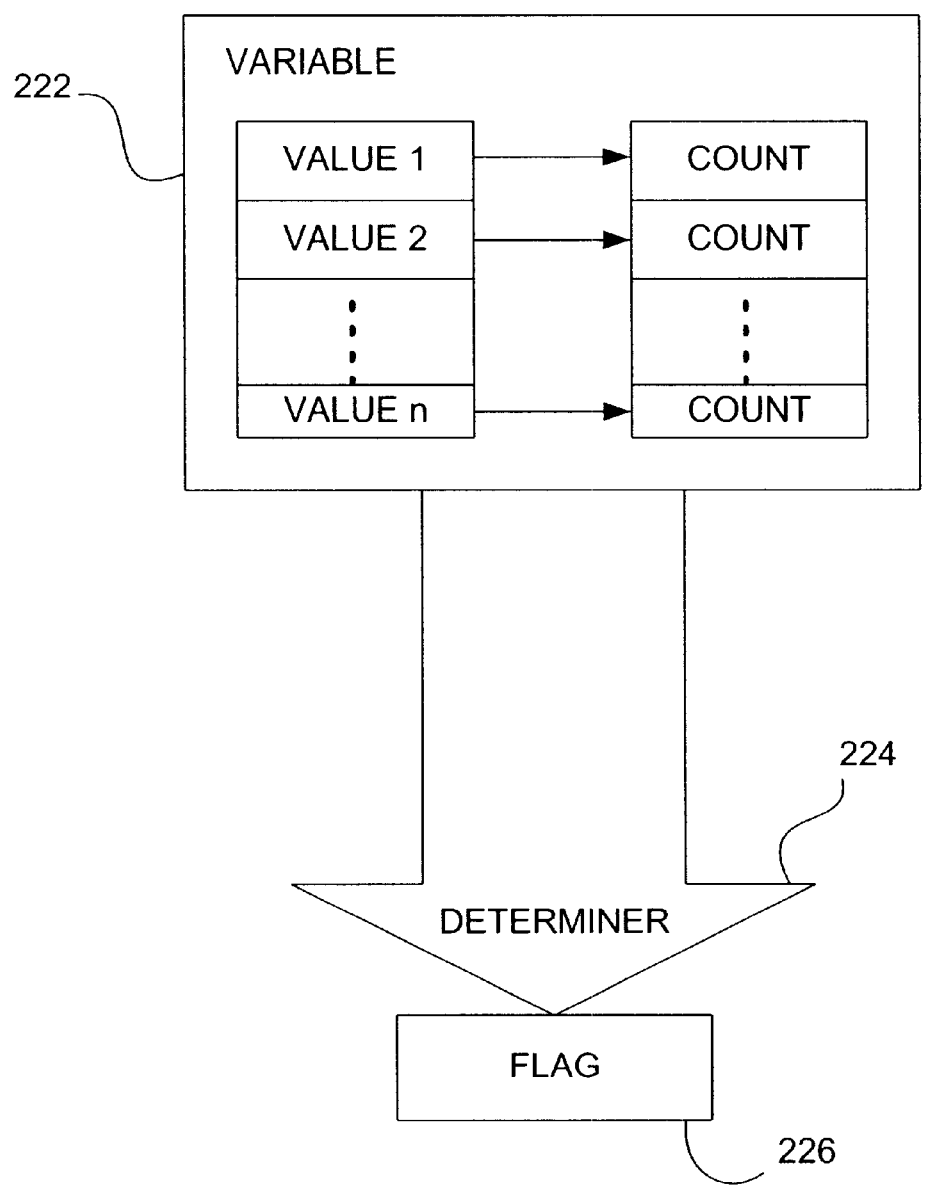
FIG. 2(d) is a diagram of a system to determine whether a variable is numeric or non-numeric, according to one embodiment of the invention.

A system to determine whether a variable is numeric or non-numeric is now described, in conjunction with FIG. 2(d). The system of FIG. 2(d) includes a variable 222, a determiner 224, and a flag 226. Each of the variable 222 and the flag 226 can in one embodiment be stored as data on a computer-readable medium, such as a memory or a hard drive. The determiner 226 can in one embodiment be a computer program, executable by a processor from a computer-readable medium. The invention is not so limited, however.

As shown in FIG. 2(d), the variable 222 has a plurality of values 1 . . . n, where each value has a corresponding count. The determiner 224 determines whether the variable 222 is numeric or non-numeric, by assessing the closeness of counts for adjacent values of the variable; in one embodiment, this is accomplished in accordance with the method of FIG. 2(c) that has been described. The determiner 224 then sets the flag accordance to its determination. For example, in one embodiment, the flag has a Boolean value, such that it is TRUE if the variable is numeric, and FALSE if the variable is non-numeric; the invention is not so limited, however.

Determining Whether a Numeric Variable has a Gaussian or a log-Gaussian Distribution In this section, description is provided as to determining whether a numeric (non-transactional) variable should have a Gaussian or a log-Gaussian distribution, in accordance with one embodiment of the invention. This determination is made by the layer 502 of FIG. 5(a) in one embodiment. However, it is noted that the invention is not so limited to determination by the layer. Furthermore, those of ordinary skill within the art can appreciate that a numeric variable can have other distributions besides Gaussian or log-Gaussian distributions.

The description provided here is based on the insight that the distribution that should be chosen is that which best predicts new data. To that end, a determination is made with two random samples of the variable from the data set—for example, where each random sample includes 1000 cases (records) of the data set having values for the variable. One of the random samples is used to train the parameters of a model (e.g., the parameters of a Gaussian and a log-Gaussian distribution, as known to and understood by those of ordinary skill within the art), and the other random sample is used to determine how well the trained model predicts new data (i.e., the "new" data being this second random sample).

Figure 3A:
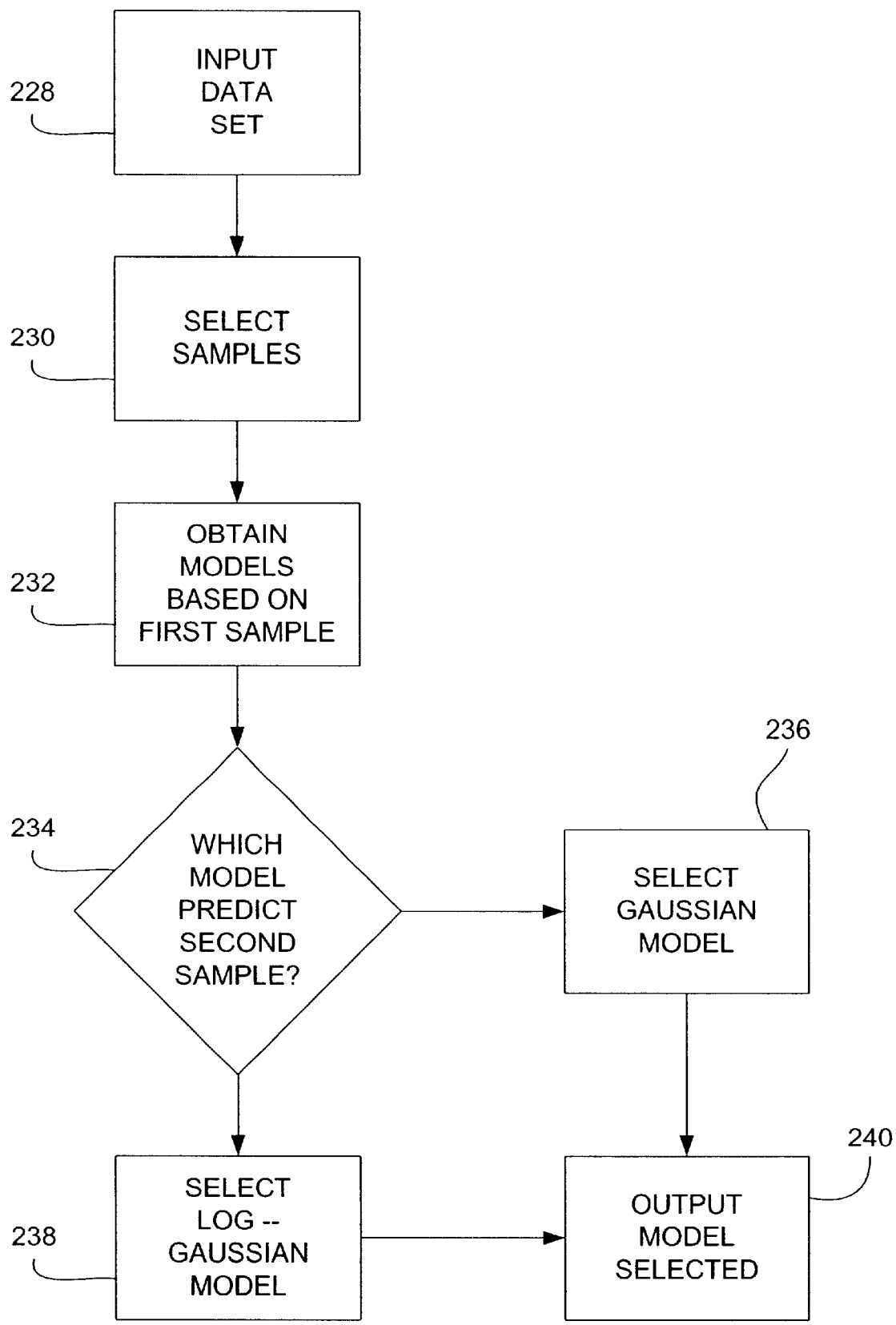
FIG. 3(a) is a flowchart of a method to determine whether a numeric variable should have a Gaussian or a log-Gaussian distribution, according to one embodiment of the invention.

A computer-implemented method is now described, in conjunction with and in reference to FIG. 3(a). The computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

In 228, a data set is input. The data set desirably represents a real-world event or events—for example, the stories read by users of a web site, the television shows watched by viewers, etc. Each record has at least one attribute. The set of all attributes is referred to as the attribute set for the problem domain. Each attribute has a default value. In general, the data set is desirably such that most attribute values for a given record are equal to the default value, although the invention is not so limited. Each attribute is also referred to as a raw variable, and can be a transactional or a non-transactional variable, as has been described. At least one of the variables is a numeric variable.

Figure 3B:
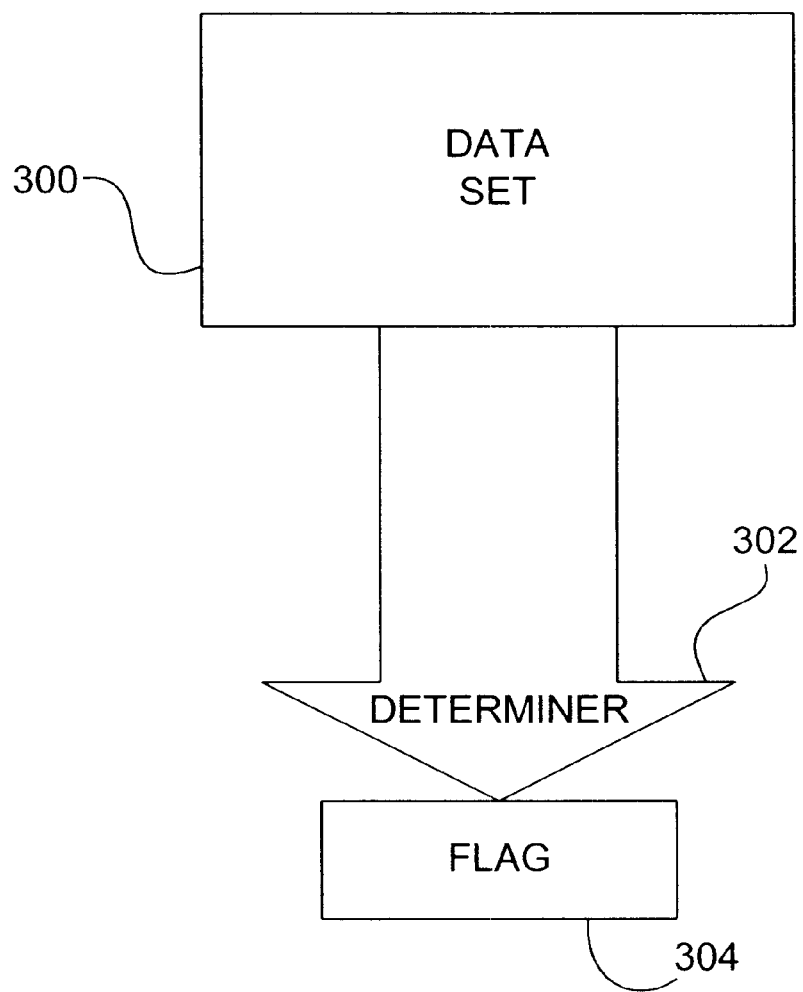
FIG. 3(b) is a diagram of a system to determine whether a numeric variable should have a Gaussian or a log-Gaussian distribution, according to one embodiment of the invention.

Next, it is determined whether a Gaussian or a log-Gaussian distribution better predicts the numeric variables, based on the plurality of records. 230, 232, 234, 236 and 238 in the method of FIG. 3(*a*) are performed to make this determination in one embodiment. The invention itself, however, is not necessarily so limited. It is noted also that the terms Gaussian and log-Gaussian distributions are shorthand for what those of ordinary skill within the art can appreciate as more properly referred to as binomial Gaussian and binomial log-Gaussian distributions.

First, in 230, two samples are selected, a training sample and a testing sample. Each sample includes the values for the numeric variable from a predetermined number of records of the data set. In one embodiment, the predetermined number is 1000, although the invention itself is not so limited.

Next, in 232, models are obtained for the training sample by training the parameters for the models—a Gaussian model (viz., distribution), and a log-Gaussian model (viz., distribution). Thus, in 232, by training the parameters of the models, as known within the art, both a log-Gaussian model and a Gaussian model for the training sample are obtained. Then, in 234, it is determined which of these models better predicts the values for the numeric variable in the testing sample. If it is the Gaussian model, then this distribution is selected in 236; otherwise, if it is the log-Gaussian model, then that distribution is selected in 238.

In 240, the selected distribution is output. The invention is not limited to the manner by which output is accomplished. For example, in one embodiment, it can be output to a further analysis program or software component, that allows for analysis and conclusions to be drawn. As another example, the output can be displayed on a displayed device, or printed to a printer, etc.

In one embodiment, a specific algorithm to determine whether a log-Gaussian or a Gaussian distribution should be used for a numeric variable of a data set is as follows:

```
Algorithm
Input: Train vector corresponding to a random sample of a
variable known to numeric
    Test vector corresponding to a random sample of
    the same variable
Output: One of (discrete-Gaussian, discrete-log-Gaussian)
If any element in the vector is 0 or negative then return Normal
Else
    a = mean of Train[x]
    b = stdev of Train[x]
    Gaussian-score = ( sum over x: (Test[x]-a)^2 )/b^2
    //a high score corresponds to a worse prediction
    For every x in train data
        LogTrain[x] = log(Train[x])
    For every x in test data
        LogTest[x] = log(Test[x])
    c = mean of LogTrain[x]
    d = stdev of LogTrain[x]
    log-Gaussian-score = ( sum over x: (LogTest[x]-c)^2 )/d^2
    If Gaussian-score > log-Gaussian-score then return
    discrete-log-Gaussian
```

```
                                -continued
    Else return discrete-Gaussian
End Algorithm
```

A system to determine whether a Gaussian or a log-Gaussian distribution should be chosen for a numeric variable is now described, in conjunction with FIG. 3(*b*). The system of FIG. 3(*b*) includes a data set 300, a determiner 302, and a flag 304. Each of the data set 300 and the flag 304 can in one embodiment be stored as data on a computer-readable medium, such as a memory or a hard drive. The determiner 302 can in one embodiment be a computer program, executable by a processor from a computer-readable medium. The invention is not so limited, however.

The data set 300 has a plurality of records. Each record has a value for each of a plurality of raw non-transactional variables, where the variables include at least one numeric variable, as has been described in conjunction with 228 of FIG. 3(*a*). The determiner 302 determines whether a Gaussian or a log-Gaussian distribution better predicts the numeric variable of the data set (in the case where there is only one numeric variable). In one embodiment, this is accomplished in accordance with the method of FIG. 3(*a*) that has been described. The determined 302 then sets the flag 304 in accordance with its determination. For example, in one embodiment, the flag has a Boolean value, such that it is TRUE if the distribution that better predicts the numeric variable is Gaussian, and FALSE if the distribution that better predicts the numeric variable is non-Gaussian; the invention is not so limited, however.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method comprising:

inputting a variable having a plurality of values, each value having a count;

determining whether the variable is one of numeric and non-numeric by assessing closeness of counts for adjacent values of the variable; and, outputting whether the variable is the one of numeric and non-numeric.

2. The method of claim 1, wherein determining whether the variable is one of numeric and non-numeric comprises:

determining whether any value of the variable is non-numeric; and, upon determining that any value of the variable is non-numeric, determining that the variable is non-numeric.

3. The method of claim 1, wherein determining whether the variable is one of numeric and non-numeric comprises:

determining whether no value of the variable has a non-numeric name;

upon determining that no value of the variable has a non-numeric name, determining whether a number of the plurality of values of the variable is greater than a predetermined threshold;

upon determining that the number of the plurality of values of the variable is greater than the predetermined threshold, determining that the variable is numeric.

4. The method of claim 1, wherein determining whether the variable is one of numeric and non-numeric comprises:
- determining whether no value of the variable has a non-numeric name;
- upon determining that no value of the variable has a non-numeric name,
  - determining whether a number of the plurality of values of the variable is less than a predetermined threshold;
  - upon determining that the number of the plurality of values of the variable is less than the predetermined threshold, determining that the variable is non-numeric.

5. The method of claim 1, wherein determining whether the variable is one of numeric and non-numeric comprises:
- determining whether no value of the variable has a non-numeric name;
- upon determining that no value of the variable has a non-numeric name,
  - determining whether a number of the plurality of values of the variable is greater than a first predetermined threshold and less than a second predetermined threshold;
  - upon determining that the number of the plurality of values of the variable is greater than the first predetermined threshold and less than the second predetermined threshold, determining whether the variable is the one of non-numeric and numeric by performing a statistical analysis of a histogram of the plurality of values.

6. The method of claim 5, wherein performing a statistical analysis comprises:
- calculating a first sum of the counts of the values of the variable;
- permutating randomly the counts of the values of the variable;
- calculating a second sum of the counts of the values of the variable, as have been permutated randomly;
- determining a mean and a standard deviation of the second sum; and,
- determining whether the variable is the one of non-numeric and numeric based on the mean and the standard deviation of the second sum.

7. A machine-readable medium having instructions stored thereon for execution by a processor to perform a method comprising:
- inputting a variable having a plurality of values, each value having a count;
- determining whether the variable is one of numeric and non-numeric by assessing closeness of counts for adjacent values of the variable; and,
- outputting whether the variable is the one of numeric and non-numeric.

8. The medium of claim 7, wherein determining whether the variable is one of numeric and non-numeric comprises:
- determining whether any value of the variable has a non-numeric name; and,
- upon determining that any value of the variable has a non-numeric name, determining that the variable is non-numeric.

9. The medium of claim 7, wherein determining whether the variable is one of numeric and non-numeric comprises:
- determining whether no value of the variable has a non-numeric name;
- upon determining that no value of the variable has a non-numeric name,
  - determining whether a number of the plurality of values of the variable is greater than a predetermined threshold;
  - upon determining that the number of the plurality of values of the variable is greater than the predetermined threshold, determining that the variable is numeric.

10. The medium of claim 7, wherein determining whether the variable is one of numeric and non-numeric comprises:
- determining whether no value of the variable has a non-numeric name;
- upon determining that no value of the variable has a non-numeric name,
  - determining whether a number of the plurality of values of the variable is less than a predetermined threshold;
  - upon determining that the number of the plurality of values of the variable is less than the predetermined threshold, determining that the variable is non-numeric.

11. The medium of claim 7, wherein determining whether the variable is one of numeric and non-numeric comprises:
- determining whether no value of the variable has a non-numeric name;
- upon determining that no value of the variable has a non-numeric name,
  - determining whether a number of the plurality of values of the variable is greater than a first predetermined threshold and less than a second predetermined threshold;
  - upon determining that the number of the plurality of values of the variable is greater than the first predetermined threshold and less than the second predetermined threshold, determining whether the variable is the one of non-numeric and numeric by performing a statistical analysis of a histogram of the plurality of values.

12. The medium of claim 11, wherein performing a statistical analysis comprises:
- calculating a first sum of the counts of the values of the variable;
- permutating randomly the counts of the values of the variable;
- calculating a second sum of the counts of the values of the variable, as have been permutated randomly;
- determining a mean and a standard deviation of the second sum; and,
- determining whether the variable is the one of non-numeric and numeric based on the mean and the standard deviation of the second sum.

13. A computerized system comprising:
- a variable having a plurality of values, each value having a count;
- a flag indicating whether the variable is one of numeric and non-numeric; and,
- a determiner to set the flag based on the plurality of values of the variable, by assessing closeness of counts for adjacent values of the variable.

14. The system of claim 13, wherein the determiner is to set the flag by performing a method comprising:
- determining whether any value of the variable has a non-numeric name; and,
- upon determining that any value of the variable has a non-numeric name, determining that the variable is non-numeric.

15. The system of claim 14, wherein the method performed by the determiner further comprises:

determining whether no value of the variable has a non-numeric name;

upon determining that no value of the variable has a non-numeric name, determining whether a number of the plurality of values of the variable is greater than a predetermined threshold;

upon determining that the number of the plurality of values of the variable is greater than the predetermined threshold, determining that the variable is numeric.

16. The system of claim 14, wherein the method performed by the determiner further comprises:

determining whether no value of the variable has a non-numeric name;

upon determining that no value of the variable has a non-numeric name, determining whether a number of the plurality of values of the variable is less than a predetermined threshold;

upon determining that the number of the plurality of values of the variable is less than the predetermined threshold, determining that the variable is non-numeric.

17. The system of claim 14, wherein the method performed by the determiner further comprises:

determining whether no value of the variable has a non-numeric name;

upon determining that no value of the variable has a non-numeric name, determining whether a number of the plurality of values of the variable is greater than a first predetermined threshold and less than a second predetermined threshold;

upon determining that the number of the plurality of values of the variable is greater than the first predetermined threshold and less than the second predetermined threshold, determining whether the variable is the one of non-numeric and numeric by performing a statistical analysis of a histogram of the plurality of values.

18. The system of claim 17, wherein performing a statistical analysis comprises:

calculating a first sum of the counts of the values of the variable;

permutating randomly the counts of the values of the variable;

calculating a second sum of the counts of the values of the variable, as have been permutated randomly;

determining a mean and a standard deviation of the second sum; and, determining whether the variable is the one of non-numeric and numeric based on the mean and the standard deviation of the second sum.

19. The system of claim 13, where each of the variable and the flag is stored as data on a computer-readable medium.

20. The system of claim 13, wherein the determiner comprises a computer program executable by a processor from a computer-readable medium.

* * * * *